US009392458B2

(12) United States Patent
Cherian et al.

(10) Patent No.: US 9,392,458 B2
(45) Date of Patent: *Jul. 12, 2016

(54) AUTHENTICATION FOR RELAY DEPLOYMENT

(71) Applicant: QUALCOMM Incorporated, San Diego, CA (US)

(72) Inventors: George Cherian, San Diego, CA (US); Santosh Paul Abraham, San Diego, CA (US); Maarten Menzo Wentink, Naarden (NL); Simone Merlin, Solana Beach, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/207,440

(22) Filed: Mar. 12, 2014

(65) Prior Publication Data
US 2014/0282909 A1 Sep. 18, 2014

Related U.S. Application Data

(60) Provisional application No. 61/789,915, filed on Mar. 15, 2013.

(51) Int. Cl.
H04L 29/06 (2006.01)
H04W 12/06 (2009.01)
(Continued)

(52) U.S. Cl.
CPC ........... *H04W 12/06* (2013.01); *H04L 63/0884* (2013.01); *H04L 63/0892* (2013.01); *H04L 63/10* (2013.01); *H04L 63/162* (2013.01); *H04W 12/04* (2013.01); *H04W 88/08* (2013.01)

(58) Field of Classification Search
CPC ...... H04L 63/10; H04L 63/08; H04L 63/0892
USPC .......................................................... 726/4
See application file for complete search history.

(56) References Cited

U.S. PATENT DOCUMENTS 7,814,322 B2  10/2010  Gurevich et al.
8,959,587 B2  2/2015  Sreemanthula et al.
(Continued)

FOREIGN PATENT DOCUMENTS

WO  2006000239 A1  1/2006
WO  2006047643 A2  5/2006
WO  2008030705 A2  3/2008

OTHER PUBLICATIONS

Second Written Opinion from International Application No. PCT/US2014/026762, dated Mar. 13, 2015, 11 pp.
Braskich T., et al., "Efficient Mesh Security and Link Establishment; 11-06-1470-03-000s-efficient-mesh-security-and-link-establishment," IEEE-SA Mentor, Piscataway, NJ USA, IEEE P802.11 Wireless LANs, doc.: IEEE 802.11-06/1470r3, Nov. 12, 2006, vol. 802.11s (3), pp. 1-60, XP017686061, [retrieved on Nov. 12, 2006] Section 8.8.
(Continued)

*Primary Examiner* — Syed Zaidi
(74) *Attorney, Agent, or Firm* — Arent Fox LLP

(57) ABSTRACT

Techniques for proving enterprise mode security for relays are disclosed. For example, enterprise mode security based on IEEE 802.1x is provided for relays or other similar devices to extend the coverage of access point hotspots or other similar access point use cases. According to one aspect, a relay incorporates an authentication client associated with an authentication server. According to another aspect, a four address format is employed for tunneling messages via a relay between a station and an access point. According to another aspect, a cryptographic master key associated with an access point and a station is provided to a relay to enable the relay to be an authenticator for the station.

20 Claims, 29 Drawing Sheets

(51) Int. Cl.
*H04W 12/04* (2009.01)
*H04W 88/08* (2009.01)

(56) References Cited

U.S. PATENT DOCUMENTS

| | | | |
|---|---|---|---|
| 2002/0066036 | A1 | 5/2002 | Makineni et al. |
| 2006/0146752 | A1* | 7/2006 | Jang et al. ............. 370/331 |
| 2006/0236377 | A1 | 10/2006 | Metke et al. |
| 2008/0065884 | A1 | 3/2008 | Emeott et al. |
| 2008/0076425 | A1 | 3/2008 | Khetawat et al. |
| 2008/0104687 | A1 | 5/2008 | Fujiwara et al. |
| 2008/0298595 | A1* | 12/2008 | Narayanan et al. ...... 380/278 |
| 2009/0164785 | A1 | 6/2009 | Metke et al. |
| 2011/0047592 | A1 | 2/2011 | Feder et al. |
| 2011/0228755 | A1* | 9/2011 | Seok ............. 370/338 |
| 2013/0014217 | A1 | 1/2013 | Yadav et al. |
| 2014/0086215 | A1* | 3/2014 | Duo et al. ............. 370/332 |
| 2014/0281541 | A1 | 9/2014 | Cherian et al. |

OTHER PUBLICATIONS

Freeradius A.D., "RADIUS over TCP; rfc6613.txt", RADIUS Over TCP; RFC6613.TXT, Internet Engineering Task Force, IETF; Standard, Internet Society (ISOC) 4, Rue Des Falaises CH—1205 Geneva,Switzerland, May 29, 2012, pp. 1-16, XP015081540, [retrieved on May 29, 2012].
International Search Report and Written Opinion—PCT/US2014/026762—ISA/EPO—Sep. 3, 2014.
Wierenga K., et al.,"Transport Layer Security (TLS) Encryption for RADIUS; rfc6614.txt", Transport Layer Security (TLS) Encryption for RADIUS; RFC6614.TXT, Internet Engineering Task Force, IETF; Standard, Internet Society (ISOC) 4, Rue Des Falaises CH—1205 Geneva, Switzerland, May 29, 2012, pp. 1-22, XP015081541, [retrieved on May 29, 2012].
Ala-Laurilla et al., Wireless LAN Access Network Architecture for Mobile Operators, IEEE Communication Magazine, XP-001107810, Nov. 2001, pp. 82-89.

* cited by examiner

A FIRST APPARATUS (E.G., AN ACCESS POINT OR ACCESS TERMINAL) COMMUNICATES
WITH A SECOND APPARATUS (E.G., A RELAY) TO ASSOCIATE
THE SECOND APPARATUS WITH THE FIRST APPARATUS
1002

↓

THE FIRST APPARATUS COMMENCES COMMUNICATION WITH A THIRD APPARATUS
(E.G., AN ACCESS TERMINAL OR ACCESS POINT) VIA THE SECOND APPARATUS,
WHEREIN THE THIRD APPARATUS IS ASSOCIATED WITH
THE SECOND APPARATUS BUT NOT THE FIRST APPARATUS
1004

↓

THE FIRST APPARATUS COMMUNICATES WITH THE THIRD APPARATUS VIA THE SECOND
APPARATUS USING A MESSAGE (E.G., EAPOL FRAME) COMPRISING A SOURCE ADDRESS, A
DESTINATION ADDRESS, A TRANSMITTER ADDRESS, AND A RECEIVER ADDRESS (E.G., A DOWNLINK MESSAGE COMPRISES A SOURCE ADDRESS ASSOCIATED WITH THE
FIRST APPARATUS, A DESTINATION ADDRESS ASSOCIATED WITH THE THIRD APPARATUS, A
TRANSMITTER ADDRESS ASSOCIATED WITH THE FIRST APPARATUS, AND A RECEIVER
ADDRESS ASSOCIATED WITH THE SECOND APPARATUS; AND
AN UPLINK MESSAGE COMPRISES A SOURCE ADDRESS ASSOCIATED WITH THE THIRD
APPARATUS, A DESTINATION ADDRESS ASSOCIATED WITH THE FIRST APPARATUS, A
TRANSMITTER ADDRESS ASSOCIATED WITH THE SECOND APPARATUS, AND A RECEIVER
ADDRESS ASSOCIATED WITH THE FIRST APPARATUS)
1006

↓

THE FIRST APPARATUS OBTAINS (E.G., DERIVES) A CRYPTOGRAPHIC KEY (E.G., PTK) AS A
RESULT OF THE COMMUNICATION WITH THE THIRD APPARATUS,
WHEREIN THE OBTAINING OF THE CRYPTOGRAPHIC KEY IS BASED ON:
THE SOURCE ADDRESS, THE DESTINATION ADDRESS, A NONCE SELECTED
BY THE FIRST APPARATUS, AND A NONCE SELECTED BY THE THIRD APPARATUS
1008

↓

THE FIRST APPARATUS USES THE CRYPTOGRAPHIC KEY TO ESTABLISH SECURE
COMMUNICATION WITH THE THIRD APPARATUS OVER A WIRELESS CHANNEL
1010

FIG. 10

AUTHENTICATION FOR RELAY DEPLOYMENT

CLAIM OF PRIORITY

This application claims the benefit of and priority to commonly owned U.S. Provisional Patent Application No. 61/789,915, filed Mar. 15, 2013, the disclosure of which is hereby incorporated by reference herein.

CROSS-REFERENCE TO RELATED APPLICATION

This application is related to concurrently filed and commonly owned U.S. patent application Ser. No. 14/207,463, entitled "AUTHENTICATION FOR RELAY DEPLOYMENT," the disclosure of which is hereby incorporated by reference herein.

BACKGROUND

1. Field

This application relates generally to wireless communication and more specifically, but not exclusively, to network authentication.

2. Introduction

Communication networks enable users to exchange messages among several interacting spatially-separated devices. Communication networks may be classified according to geographic scope, which could be, for example, a wide area, a metropolitan area, a local area, or a personal area. Such networks may be designated respectively as a wide area network (WAN), a metropolitan area network (MAN), a local area network (LAN), or a personal area network (PAN). Communication networks also differ according to the switching technique and/or routing technique employed to interconnect the various network apparatuses and devices. For example, a communication network may use circuit switching, packet switching, or some combination of the two. Communication networks can differ according to the type of physical media employed for transmission. For example, a communication network may support wired communication, wireless communication, or both types of communication. Communication networks can also use different sets of communication protocols. Examples of such communication protocols include the Internet protocol (IP) suite, synchronous optical networking (SONET) protocols, and Ethernet protocols.

In general, wireless networks employ intangible physical media in an unguided propagation mode using electromagnetic waves in radio, microwave, infrared, optical, or other frequency bands. Consequently, wireless networks are better adapted to facilitate user mobility and rapid field deployment as compared to fixed, wired networks. For example, wireless networks readily support network elements that are mobile and have dynamic connectivity needs. The use of wireless networks also may be preferred for scenarios where it is desirable to provide a network architecture having an ad hoc topology, rather than a fixed topology.

A wireless network may be deployed over a defined geographical area to provide various types of services (e.g., voice, data, multimedia services, etc.) to users within that geographical area. In a typical implementation, one or more access points are deployed to provide wireless connectivity for access terminals (e.g., STAs) that are operating within the geographical area served by the wireless network.

Some types of wireless networks employ relays. In general, a relay may be used to extend the coverage of an access point. Thus, in some aspects, a relay will include functionality similar to an access point (e.g., for communicating with access terminals) and functionality similar to an access terminal (e.g., for communicating with an access point).

Conventional relay designs (e.g., relay networks supported in Zigbee, Z-wave, etc.) employ a personal-mode of security. In some aspects, a personal mode of security means that a given access terminal's password is known to the access point (or the relay) that serves the access terminal. Thus, security is provided on a link-to-link basis.

SUMMARY

A summary of several example aspects of the disclosure follows. This summary is provided for the convenience of the reader to provide a basic understanding of such aspects and does not wholly define the breadth of the disclosure. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. For convenience, the term some aspects may be used herein to refer to a single aspect or multiple aspects of the disclosure.

The disclosure relates in some aspects to authentication techniques for relay deployments. For example, a relay may be used to extend the range (e.g., effective coverage area) of an access point deployed as a hotspot or deployed in some other similar manner. Conventionally, hotspots employ an enterprise mode of security where the access terminal's password is probably not known to the hotspot access point. Instead, an access terminal attaches to the access point based on an authentication performed between the access terminal and a network authentication server (e.g., a RADIUS server or a DIAMETER server).

The disclosure relates in some aspects to techniques for providing enterprise mode security for relays. In some aspects, enterprise mode security based on Institute of Electrical and Electronics Engineers (IEEE) 802.1x is provided for relays to enable hotspot use cases and other similar use cases for relays.

According to one aspect, a relay incorporates an authentication client associated with an authentication server. Accordingly, the relay can be an authenticator for any stations that attempt to access the network via the relay.

According to another aspect, a four-address format is employed for tunneling messages via a relay between a station and an access point. In this case, the relay can forward authentication messages between the station and the access point.

According to another aspect, a cryptographic master key associated with an access point and a station is provided to a relay to enable the relay to be an authenticator for the station. Accordingly, in the event messages from the station are destined for the relay, the relay is able to decrypt the messages.

Various aspects of the disclosure provide an apparatus configured for communication, wherein the apparatus is configured to be associated with a second apparatus. The apparatus comprising: a processing system configured to authenticate the apparatus to a server; and a communication device configured to send a message to the server to authorize the second apparatus as an authenticator.

Further aspects of the disclosure provide a method of communication, wherein a first apparatus is associated with a second apparatus. The method comprising: authenticating the first apparatus to a server; and sending a message from the first apparatus to the server to authorize the second apparatus as an authenticator.

Still further aspects of the disclosure provide another apparatus configured for communication, wherein the apparatus is configured to be associated with a second apparatus. The apparatus comprising: means for authenticating the apparatus to a server; and means for sending a message to the server to authorize the second apparatus as an authenticator.

Additional aspects of the disclosure provide a computer-program product comprising a computer-readable medium, wherein a first apparatus is associated with a second apparatus. The computer-readable medium comprising code executable to: authenticate the first apparatus to a server; and send a message from the first apparatus to the server to authorize the second apparatus as an authenticator.

Various aspects of the disclosure provide an apparatus configured for communication, wherein a second apparatus is configured to be associated with the apparatus, the apparatus is configured to be associated with a third apparatus, and the second apparatus is configured to be connected to a server. The apparatus comprising: a communication device configured to receive an authentication credential from the second apparatus to setup a session with the server; and a processing system configured to set up the session using the authentication credential, wherein the communication device is further configured to communicate with the server via the session to authenticate the third apparatus with the server.

Further aspects of the disclosure provide a method of communication, wherein a first apparatus is associated with a second apparatus, the first apparatus is associated with a third apparatus, and the second apparatus is connected to a server. The method comprising: receiving, by the first apparatus, an authentication credential from the second apparatus to setup a session with the server; setting up the session using the authentication credential; and communicating with the server via the session to authenticate the third apparatus with the server.

Still further aspects of the disclosure provide another apparatus configured for communication, wherein a second apparatus is configured to be associated with the apparatus, the apparatus is configured to be associated with a third apparatus, and the second apparatus is configured to be connected to a server. The apparatus comprising: means for receiving an authentication credential from the second apparatus to setup a session with the server; means for setting up the session using the authentication credential; and means for communicating with the server via the session to authenticate the third apparatus with the server.

Additional aspects of the disclosure provide a computer-program product comprising a computer-readable medium, wherein a first apparatus is configured to be associated with a second apparatus, the first apparatus is configured to be associated with a third apparatus, and the second apparatus is configured to be connected to a server. The computer-readable medium comprising code executable to: receive, by the first apparatus, an authentication credential from the second apparatus to setup a session with the server; set up the session using the authentication credential; and communicate with the server via the session to authenticate the third apparatus with the server.

Various aspects of the disclosure provide an apparatus configured for communication, wherein a second apparatus is configured to be authenticated to the apparatus. The apparatus comprising: a communication device configured to receive a message from the second apparatus, wherein the message identifies a third apparatus associated with the second apparatus; and a processing system configured to authorize, as a result of receiving the message, the third apparatus as an authenticator.

Further aspects of the disclosure provide a method of communication, wherein a first apparatus is authenticated to a server. The method comprising: receiving, by the server, a message from the first apparatus, wherein the message identifies a second apparatus associated with the first apparatus; and authorizing, as a result of receiving the message, the second apparatus as an authenticator.

Still further aspects of the disclosure provide another apparatus configured for communication, wherein a second apparatus is configured to be authenticated to the apparatus. The apparatus comprising: means for receiving a message from the second apparatus, wherein the message identifies a third apparatus associated with the second apparatus; and means for authorizing, as a result of receiving the message, the third apparatus as an authenticator.

Additional aspects of the disclosure provide a computer-program product comprising a computer-readable medium, wherein a first apparatus is configured to be authenticated to a server. The computer-readable medium comprising code executable to: receive, by the server, a message from the first apparatus, wherein the message identifies a second apparatus associated with the first apparatus; and authorize, as a result of receiving the message, the second apparatus as an authenticator.

Various aspects of the disclosure provide an apparatus configured for communication, wherein the apparatus is configured to be associated with a second apparatus, and the second apparatus is configured to be associated with a third apparatus. The apparatus comprising: a processing system configured to commence communication with the third apparatus via the second apparatus; and a communication device configured to communicate with the third apparatus via the second apparatus using a message comprising a source address, a destination address, a transmitter address, and a receiver address.

Further aspects of the disclosure provide a method of communication, wherein a first apparatus is associated with a second apparatus, and the second apparatus is associated with a third apparatus. The method comprising: commencing, by the first apparatus, communication with the third apparatus via the second apparatus; and communicating with the third apparatus via the second apparatus using a message comprising a source address, a destination address, a transmitter address, and a receiver address.

Still further aspects of the disclosure provide another apparatus configured for communication, wherein the apparatus is configured to be associated with a second apparatus, and the second apparatus is configured to be associated with a third apparatus. The apparatus comprising: means for commencing communication with the third apparatus via the second apparatus; and means for communicating with the third apparatus via the second apparatus using a message comprising a source address, a destination address, a transmitter address, and a receiver address.

Additional aspects of the disclosure provide a computer-program product comprising a computer-readable medium, wherein a first apparatus is configured to be associated with a second apparatus, and the second apparatus is configured to be associated with a third apparatus. The computer-readable medium comprising code executable to: commence, by the first apparatus, communication with the third apparatus via the second apparatus; and communicate with the third apparatus via the second apparatus using a message comprising a source address, a destination address, a transmitter address, and a receiver address.

Various aspects of the disclosure provide an apparatus configured for communication, wherein a second apparatus is configured to be associated with the apparatus, and the apparatus is configured to be associated with a third apparatus. The apparatus comprising: a processing system configured to commence transfer of messages between the second apparatus and the third apparatus; and a communication device configured to transfer the messages between the second apparatus and the third apparatus, wherein each message comprises a source address, a destination address, a transmitter address, and a receiver address.

Further aspects of the disclosure provide a method of communication, wherein a first apparatus is associated with a second apparatus, and the second apparatus is associated with a third apparatus. The method comprising: commencing, by the second apparatus, transfer of messages between the first apparatus and the third apparatus; and transferring the messages between the first apparatus and the third apparatus, wherein each message comprises a source address, a destination address, a transmitter address, and a receiver address.

Still further aspects of the disclosure provide another apparatus configured for communication, wherein a second apparatus is configured to be associated with the apparatus, and the apparatus is configured to be associated with a third apparatus. The apparatus comprising: means for commencing transfer of messages between the second apparatus and the third apparatus; and means for transferring the messages between the second apparatus and the third apparatus, wherein each message comprises a source address, a destination address, a transmitter address, and a receiver address.

Additional aspects of the disclosure provide a computer-program product comprising a computer-readable medium, wherein a first apparatus is configured to be associated with a second apparatus, and the second apparatus is configured to be associated with a third apparatus. The computer-readable medium comprising code executable to: commence, by the second apparatus, transfer of messages between the first apparatus and the third apparatus; and transfer the messages between the first apparatus and the third apparatus, wherein each message comprises a source address, a destination address, a transmitter address, and a receiver address.

Various aspects of the disclosure provide an apparatus configured for communication, wherein the apparatus is configured to be associated with a second apparatus and the apparatus is configured to be authenticated to a server. The apparatus comprising: a first communication device configured to receive a cryptographic master key from the server; and a second communication device configured to send the cryptographic master key to the second apparatus.

Further aspects of the disclosure provide a method of communication, wherein a first apparatus is associated with a second apparatus and the first apparatus is authenticated to a server. The method comprising: receiving, by the first apparatus, a cryptographic master key from the server; and sending the cryptographic master key to the second apparatus.

Still further aspects of the disclosure provide another apparatus configured for communication, wherein the apparatus is configured to be associated with a second apparatus and the apparatus is configured to be authenticated to a server. The apparatus comprising: means for receiving a cryptographic master key from the server; and means for sending the cryptographic master key to the second apparatus.

Additional aspects of the disclosure provide a computer-program product comprising a computer-readable medium, wherein a first apparatus is associated with a second apparatus and the first apparatus is authenticated to a server. The computer-readable medium comprising code executable to: receive, by the first apparatus, a cryptographic master key from the server; and send the cryptographic master key to the second apparatus.

Various aspects of the disclosure provide an apparatus configured for communication, wherein a second apparatus is configured to be associated with the apparatus, and the apparatus is configured to be associated with a third apparatus. The apparatus comprising: a communication device configured to receive a cryptographic master key from the second apparatus, wherein the cryptographic master key is from a server associated with the second apparatus; and a processing system configured to use the cryptographic master key to establish secure communication with the third apparatus over a wireless channel.

Further aspects of the disclosure provide a method of communication, wherein a first apparatus is associated with a second apparatus, and the second apparatus is associated with a third apparatus. The method comprising: receiving, by the second apparatus, a cryptographic master key from the first apparatus, wherein the cryptographic master key is from a server associated with the first apparatus; and using the cryptographic master key to establish secure communication with the third apparatus over a wireless channel.

Still further aspects of the disclosure provide another apparatus configured for communication, wherein a second apparatus is configured to be associated with the apparatus, and the apparatus is configured to be associated with a third apparatus. The apparatus comprising: means for receiving a cryptographic master key from the second apparatus, wherein the cryptographic master key is from a server associated with the second apparatus; and means for using the cryptographic master key to establish secure communication with the third apparatus over a wireless channel.

Additional aspects of the disclosure provide a computer-program product comprising a computer-readable medium, wherein a first apparatus is configured to be associated with a second apparatus, and the second apparatus is configured to be associated with a third apparatus. The computer-readable medium comprising code executable to: receive, by the second apparatus, a cryptographic master key from the first apparatus, wherein the cryptographic master key is from a server associated with the first apparatus; and use the cryptographic master key to establish secure communication with the third apparatus over a wireless channel.

BRIEF DESCRIPTION OF THE DRAWINGS

These and other sample aspects of the disclosure will be described in the detailed description and the claims that follow, and in the accompanying drawings, wherein:

FIG. 10 is a flowchart of several sample aspects of operations relating to relay tunneling in accordance with some aspects of the disclosure;

Figure 1:
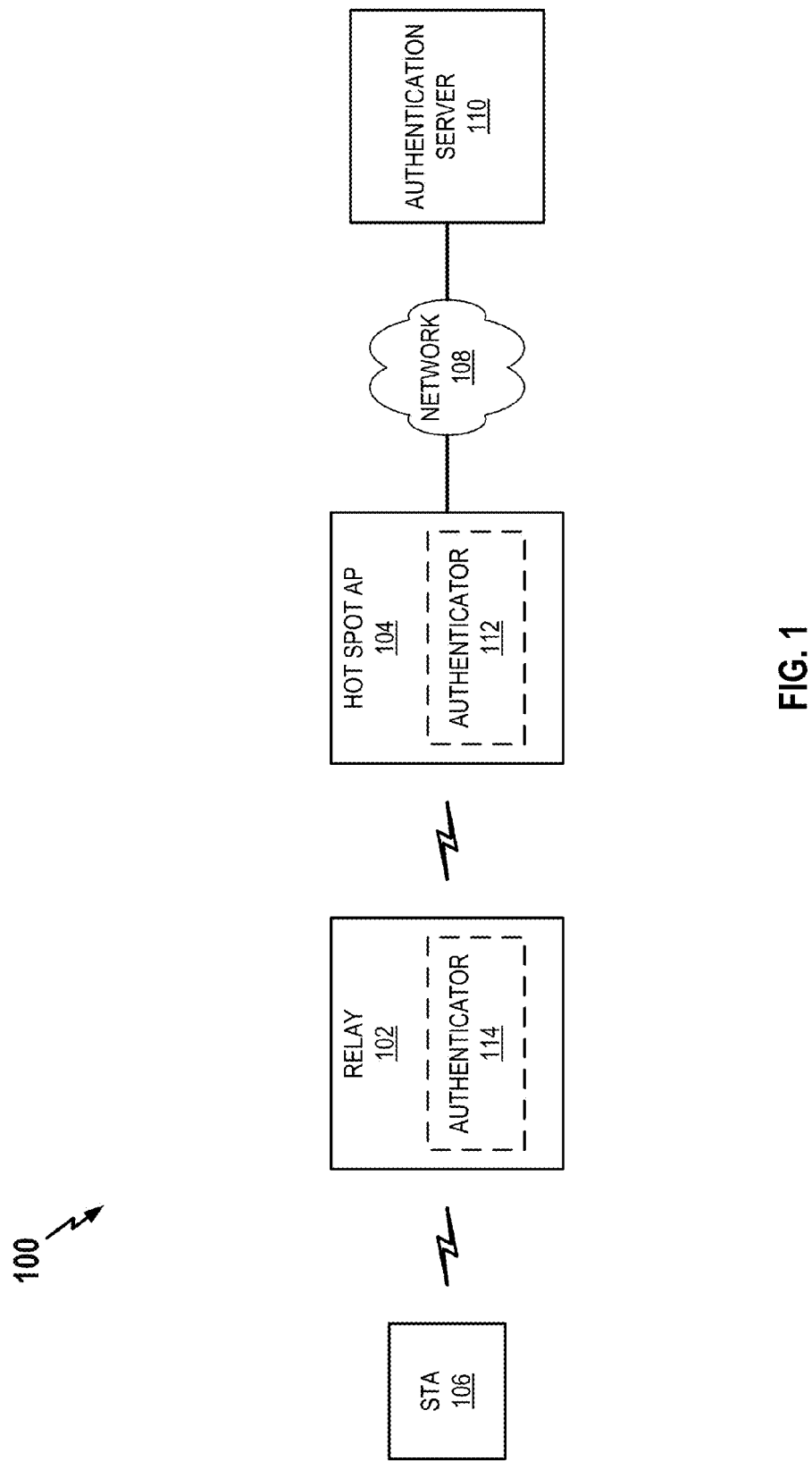
FIG. 1 illustrates an example of network entities supporting authentication in accordance with some aspects of the disclosure.

In accordance with common practice, the features illustrated in the drawings are simplified for clarity and are generally not drawn to scale. That is, the dimensions and spacing of these features are expanded or reduced for clarity in most cases. In addition, for purposes of illustration, the drawings generally do not depict all of the components that are typically employed in a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, any aspect disclosed herein may be embodied by one or more elements of a claim. As an example of the above, in some aspects, a method of wireless communication may comprise authenticating the first apparatus to a server; and sending a message from the first apparatus to the server to authorize the second apparatus as an authenticator. In addition, in some aspects, the server may comprise a RADIUS server or a DIAMETER server.

FIG. 1 illustrates a wireless network 100 where a relay 102 is used to extend the communication range of a hot spot access point (AP) 104. Thus, when a station (STA) 106 is within the coverage of the relay 102, the STA 106 can access a network 108 via the relay 102 and the AP 104.

An authentication server 110 controls whether the STA 106 is allowed to access the network 108. For example, when the STA 106 initially establishes communication with the relay 102, the STA 106 and the authentication server 110 may perform an authentication procedure, whereby the authentication server 110 verifies whether the STA 106 holds valid credentials (e.g., a master key) that indicate that the STA 106 is authorized to access the network 108.

In accordance with the teachings herein, authenticator functionality may be implemented at the relay 102 and/or the AP 104. As discussed in more detail below, the AP 104 may include an authenticator function 112 whereby the AP 104 is the authenticator for the STA 106. In addition or in the alternative, the relay 102 may include an authenticator function 114 whereby the relay 102 is the authenticator for the STA 106.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to an 802.11 protocol using orthogonal frequency-division multiplexing (OFDM), direct-sequence spread spectrum (DSSS) communication, a combination of OFDM and DSSS communication, or other schemes.

Certain of the devices described herein may further implement Multiple Input Multiple Output (MIMO) technology and be implemented as part of an 802.11 protocol. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Figure 2:
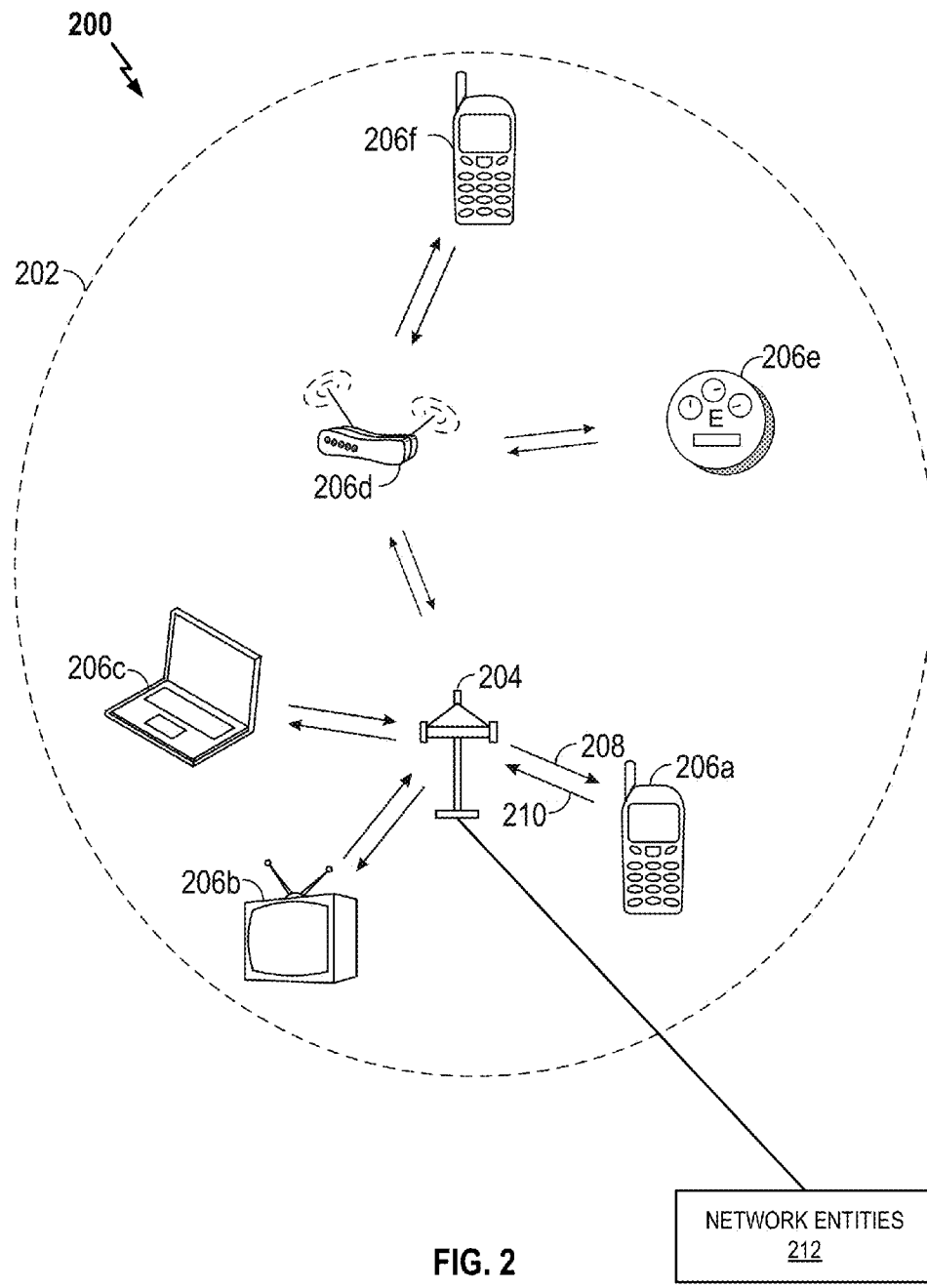
FIG. 2 illustrates an example of a network environment in which one or more aspects of the disclosure may find application.

FIG. 2 illustrates an example of a wireless communication system 200 in which aspects of the present disclosure may be employed. The wireless communication system 200 may operate pursuant to a wireless standard, for example the 802.11 standard. The wireless communication system 200 may include an AP 204, which communicates with STAs 206a, 206b, 206c, 206d, 206e, and 206f (collectively STAs 206).

STAs 206e and 206f may have difficulty communicating with the AP 204 or may be out of range and unable to communicate with the AP 204. As such, another STA 206d may be configured as a relay device (e.g., a device comprising STA and AP functionality) that relays communication between the AP 204 and the STAs 206e and 206f.

A variety of processes and methods may be used for transmissions in the wireless communication system 200 between the AP 204 and the STAs 206. For example, signals may be sent and received between the AP 204 and the STAs 206 in accordance with OFDM/OFDMA techniques. If this is the case, the wireless communication system 200 may be referred to as an OFDM/OFDMA system. Alternatively, signals may be sent and received between the AP 204 and the STAs 206 in accordance with CDMA techniques. If this is the case, the wireless communication system 200 may be referred to as a CDMA system.

A communication link that facilitates transmission from the AP 204 to one or more of the STAs 206 may be referred to as a downlink (DL) 208, and a communication link that facilitates transmission from one or more of the STAs 206 to the AP 204 may be referred to as an uplink (UL) 210. Alternatively, a downlink 208 may be referred to as a forward link or a forward channel, and an uplink 210 may be referred to as a reverse link or a reverse channel.

The AP 204 may act as a base station and provide wireless communication coverage in a basic service area (BSA) 202. The AP 204 along with the STAs 206 associated with the AP 204 and that use the AP 204 for communication may be referred to as a basic service set (BSS).

Access points may thus be deployed in a communication network to provide access to one or more services (e.g., network connectivity) for one or more access terminals that may be installed within or that may roam throughout a coverage area of the network. For example, at various points in time an access terminal may connect to the AP 204 or to some other access point in the network (not shown).

Each of the access points may communicate with one or more network entities (represented, for convenience, by network entities 212 in FIG. 2), including each other, to facilitate wide area network connectivity. A network entity may take various forms such as, for example, one or more radio and/or core network entities. Thus, in various implementations the network entities 212 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

It should be noted that in some implementations the wireless communication system 200 may not have a central AP 204, but rather may function as a peer-to-peer network between the STAs 206. Accordingly, the functions of the AP 204 described herein may alternatively be performed by one or more of the STAs 206. Also, as mentioned above, a relay may incorporate at least some of the functionality of an AP and a STA.

Referring now to FIGS. 3-15, three techniques for supporting relay authentication and other relay-related operations are described. Specifically, FIGS. 3-7 illustrate the first technique, FIGS. 8-11 illustrate the second technique, and FIGS. 12-15 illustrate the third technique.

In some aspects, these techniques may be advantageously employed in a situation where a relay is deployed on an ad hoc basis to extend the service of an access point (e.g., a hotspot). For example, the relay may be deployed by a user (e.g., business owner) of the hotspot, rather than the network operator. For purposes of illustration, these techniques may be described in the context of an 802.1x-based system where the authentication server is a RADIUS server, the authenticator is an access point (AP) or a relay, and the supplicant is a STA. It should be appreciated, however, that the teachings herein may be implemented using other types of components and/or using other types of communication technology.

Figure 3:
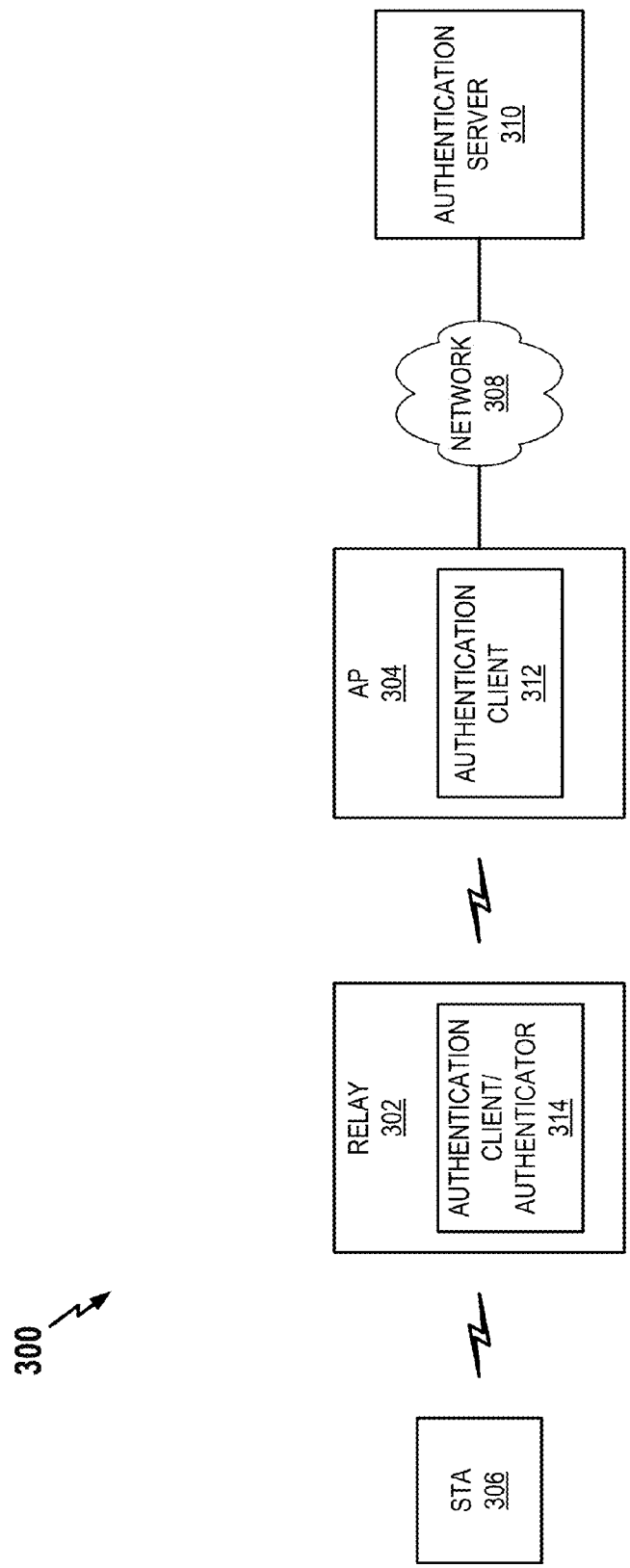
FIG. 3 illustrates an example where a relay includes an authentication client in accordance with some aspects of the disclosure.

Referring initially to FIG. 3, a wireless network 300 is illustrated where a relay 302 includes an authentication client (e.g., a RADIUS client) 314. Thus, the relay 302 can be the authenticator under 802.1x for any STAs that are within the coverage of the relay 302. Similar to FIG. 1, the simplified example of FIG. 3 illustrates an AP 304, a STA 306, a network 308, and an authentication server 310. In accordance with conventional practice, the AP 304 includes an authentication client (e.g., a RADIUS client) 312 for authenticating any STAs that are in direct communication with the AP 304 (e.g., within the coverage of the AP 304).

In a RADIUS environment, in such a relay-to-host RADIUS server implementation, the relay is admitted as a RADIUS client. Conventionally, a RADIUS session is setup between two trusted entities. In accordance with the teachings herein, a mechanism is provided to enable a RADIUS server to "trust the relay" before establishing a RADIUS session with the relay.

Figure 4:
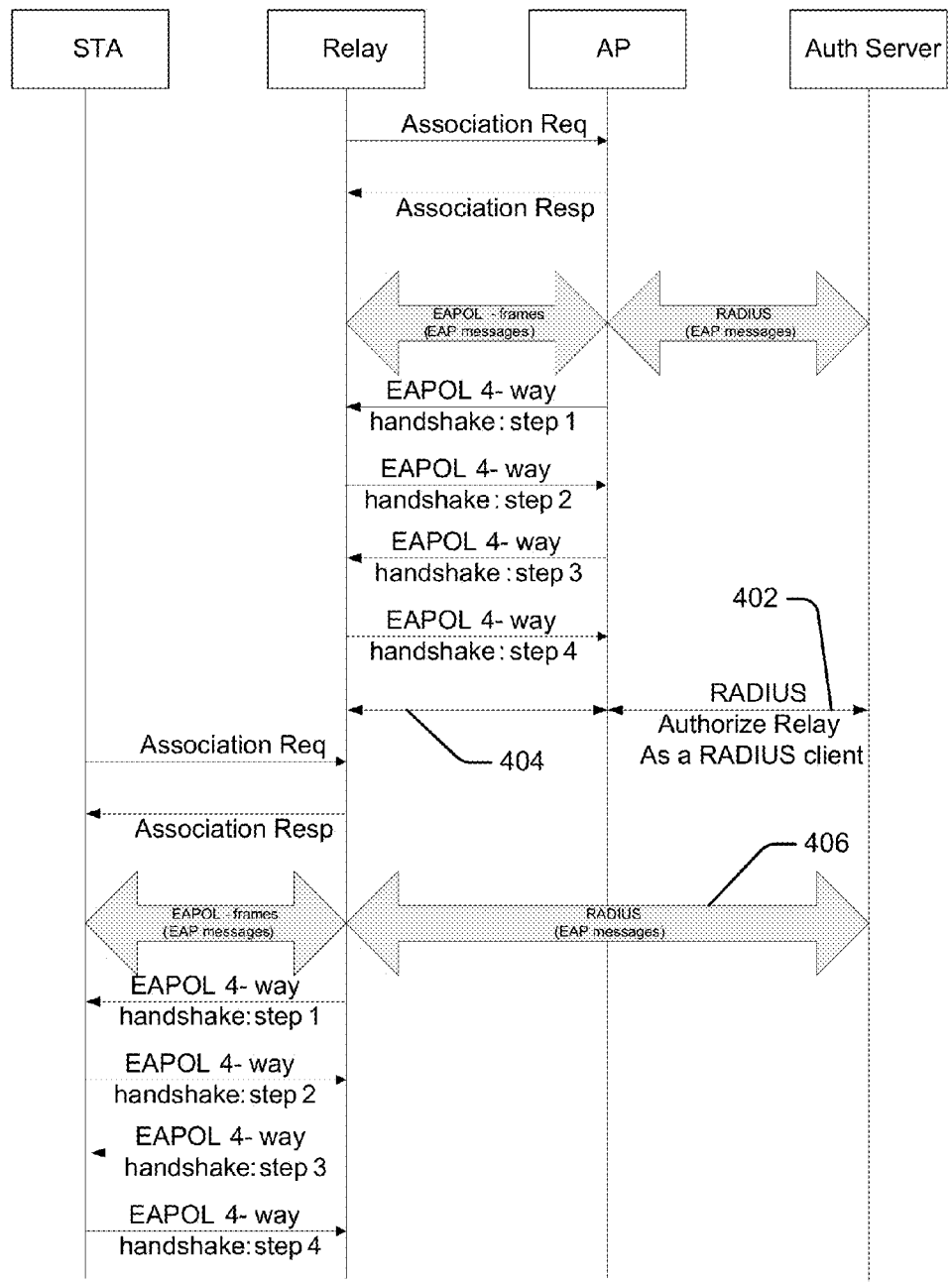
FIG. 4 illustrates an example of a scheme for authentication in accordance with some aspects of the disclosure.

FIG. 4 depicts an example of message flow that may be employed in conjunction with the relay to host RADIUS server implementation. It is assumed that the AP has already been admitted as a RADIUS client. At some point in time, a relay is associated with the AP (e.g., via the association request and response). The relay is then authenticated by the AP. As shown in FIG. 4, the AP and the relay establish secure communication via a 4-way handshake procedure.

In addition, a signaling message 402 is defined between the AP and the RADIUS server to admit the relay as a new RADIUS client. For example, the AP may send a RADIUS message requesting the RADIUS server to authorize the relay as a RADIUS client. In response to this message, the RADIUS server sends a RADIUS authentication credential for setting up a session between the RADIUS server and the relay to the AP. As indicated by the line 404 in FIG. 4, the AP forwards this authentication credential to the relay. Thus, at this point, the RADIUS server is aware of the new RADIUS client (the relay) and the RADIUS server allows a RADIUS session 406 to be set up between the RADIUS server and the relay.

Subsequently, when a STA is associated with the relay (e.g., via an association request and response), the relay serves as the 802.1x authenticator. Thus, the STA may establish a RADIUS session with the RADIUS server via the relay. As shown in FIG. 4, in this case, the STA and the relay may conduct a 4-way handshake procedure to establish secure communication on a wireless channel (e.g., an 802.11-based channel).

In some implementations, information regarding all of the relays in the system that may potentially be RADIUS clients is stored in a database (e.g., a AAA database) that is associated with the RADIUS server. In this case, a RADIUS server may use this information to admit the relay as a new client (e.g., with or without the assistance of the AP as described herein).

Examples of authentication-related and/or relay-related operations that may be performed in accordance with the first technique are described in more detail with reference to FIGS. 5-7. For purposes of illustration, these operations (or any other operations described herein) may be described as being performed by a specific apparatus. It should be appreciated, however, that these operations may be performed by different types of apparatuses in different implementations.

Figure 5:
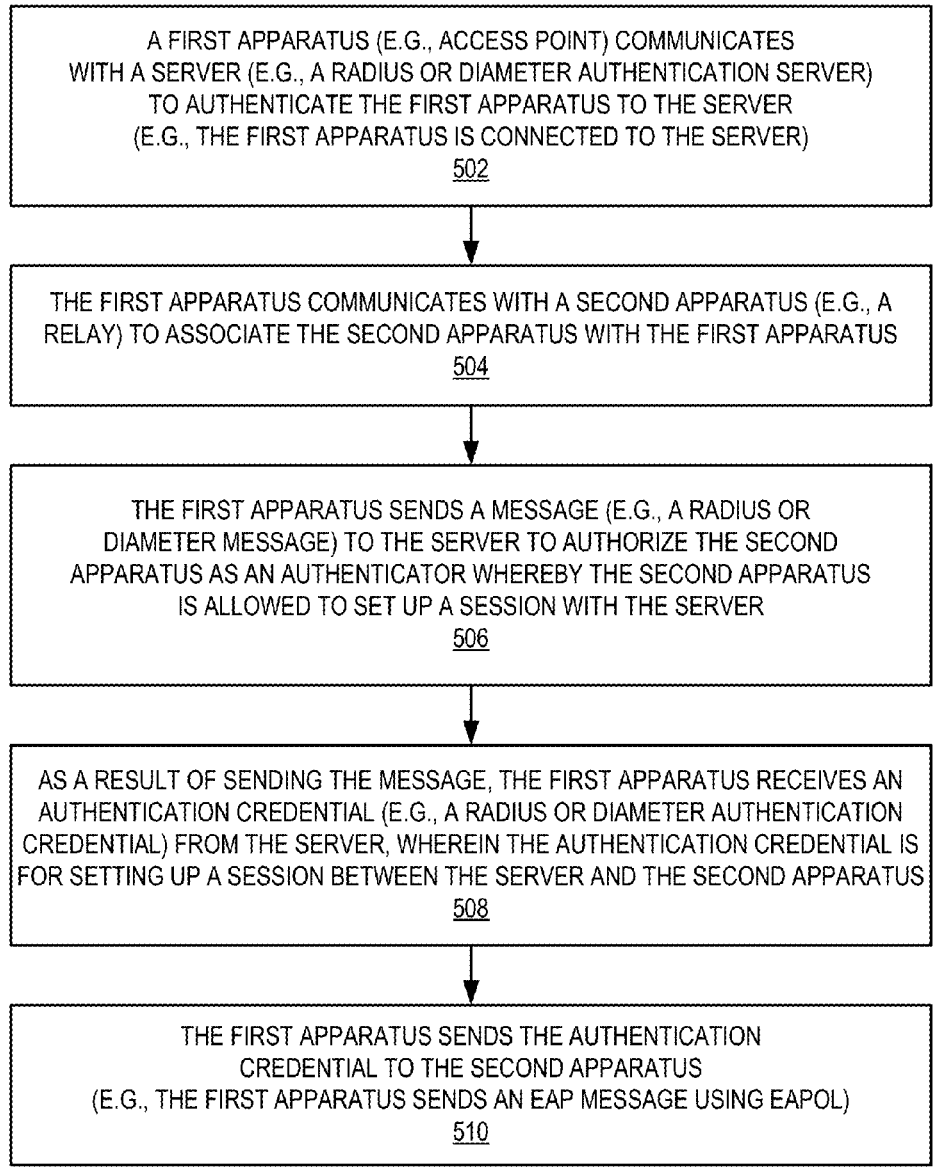
FIG. 5 is a flowchart of several sample aspects of operations relating to authentication in accordance with some aspects of the disclosure.

Referring initially to FIG. 5, in some aspects, this flowchart describes sample operations that may be performed by a first apparatus in conjunction with enabling a second apparatus to be admitted as a client to a server. In some implementations, the first apparatus may comprise an access point or some other suitable type of node (e.g., a relay), while the second apparatus may comprise a relay or some other suitable type of node.

As represented by block 502, a first apparatus (e.g., access point) communicates with a server (e.g., a RADIUS or DIAMETER authentication server) to authenticate the first apparatus to the server (e.g., the first apparatus is connected to the server).

As represented by block 504, the first apparatus communicates with a second apparatus (e.g., a relay) to associate the second apparatus with the first apparatus (e.g., via an association request and response). For example, upon association, the second apparatus may be served by and/or connected to the first apparatus.

As represented by block 506, the first apparatus sends a message (e.g., a RADIUS or DIAMETER message) to the server to authorize the second apparatus as an authenticator whereby the second apparatus is allowed to set up a session with the server. In some aspects, the message may comprise a request to admit the second apparatus as a client of the server.

As represented by block 508, as a result of sending the message, the first apparatus receives an authentication credential (e.g., a RADIUS or DIAMETER authentication credential) from the server, wherein the authentication credential is for setting up a session between the server and the second apparatus.

As represented by block 510, the first apparatus sends the authentication credential to the second apparatus (e.g., the first apparatus sends an EAP message using EAPOL).

Figure 6:
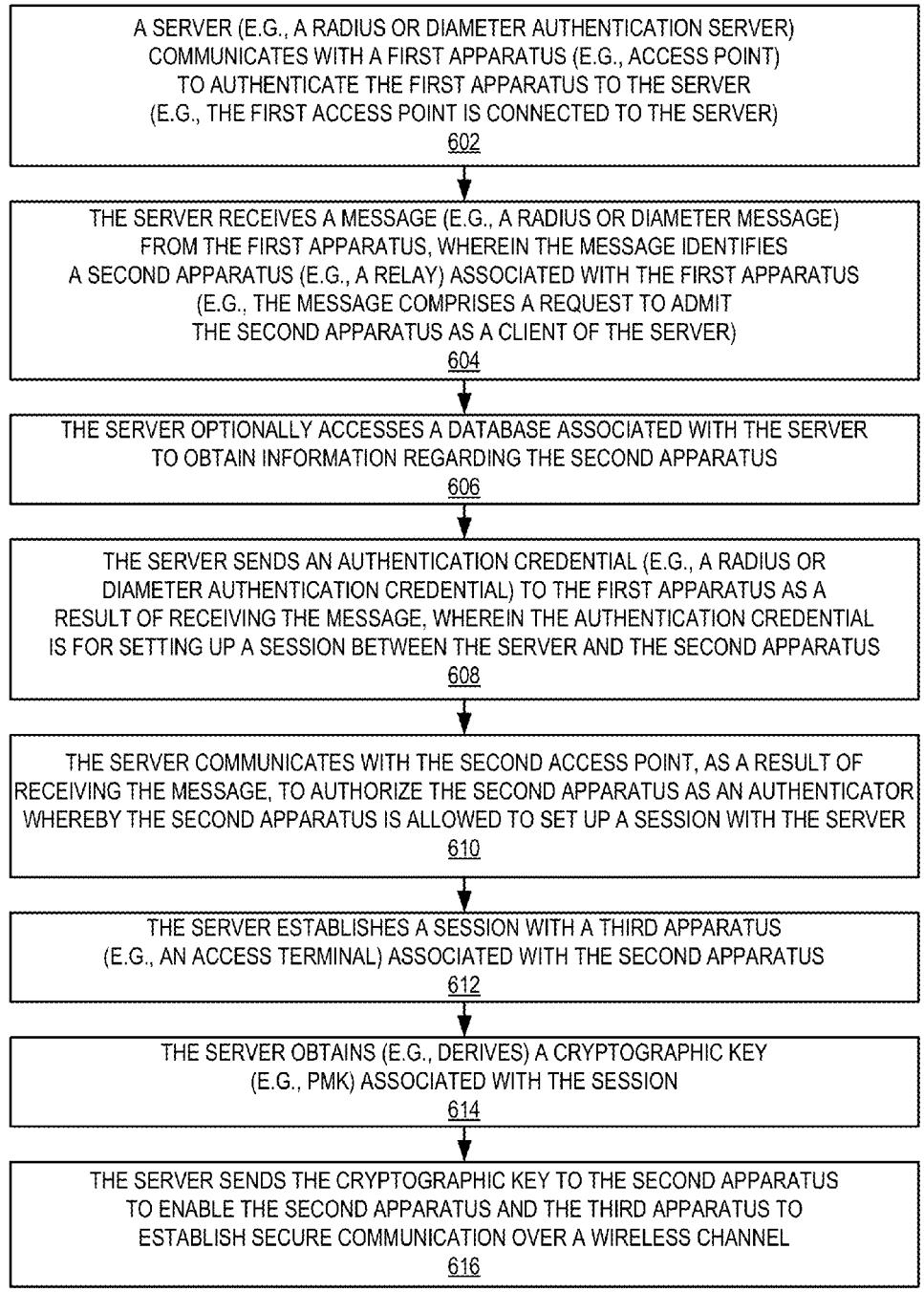
FIG. 6 is a flowchart of several sample aspects of operations relating to authentication in accordance with some aspects of the disclosure.

Referring to FIG. 6, in some aspects, this flowchart describes sample operations that may be performed by a server in conjunction with enabling a second apparatus to be admitted as a client to the server. In some implementations, the second apparatus may comprise a relay or some other suitable type of node (e.g., an access point). In some implementations, the server may comprise some other suitable type of node (e.g., network entity).

As represented by block 602, a server (e.g., a RADIUS or DIAMETER authentication server) communicates with a first apparatus (e.g., access point) to authenticate the first apparatus to the server (e.g., the first access point is connected to the server).

As represented by block 604, the server receives a message (e.g., a RADIUS or DIAMETER message) from the first apparatus, wherein the message identifies a second apparatus (e.g., a relay) associated with the first apparatus (e.g., the message comprises a request to admit the second apparatus as a client of the server).

As represented by block 606, the server optionally accesses a database associated with the server to obtain information regarding the second apparatus.

As represented by block 608, the server sends an authentication credential (e.g., a RADIUS or DIAMETER authentication credential) to the first apparatus as a result of receiving the message, wherein the authentication credential is for setting up a session between the server and the second apparatus.

As represented by block 610, the server communicates with the second apparatus, as a result of receiving the message, to authorize the second apparatus as an authenticator whereby the second apparatus is allowed to set up a session with the server. In some aspects, authorization of the second apparatus as an authenticator comprises accessing the database associated with the server.

As represented by block 612, the server establishes a session with a third apparatus (e.g., an access terminal) associated with the second apparatus.

As represented by block 614, the server obtains (e.g., derives) a cryptographic key (e.g., PMK) associated with the session.

As represented by block 616, the server sends the cryptographic key to the second apparatus to enable the second apparatus and the third apparatus to establish secure communication over a wireless channel.

Figure 7:
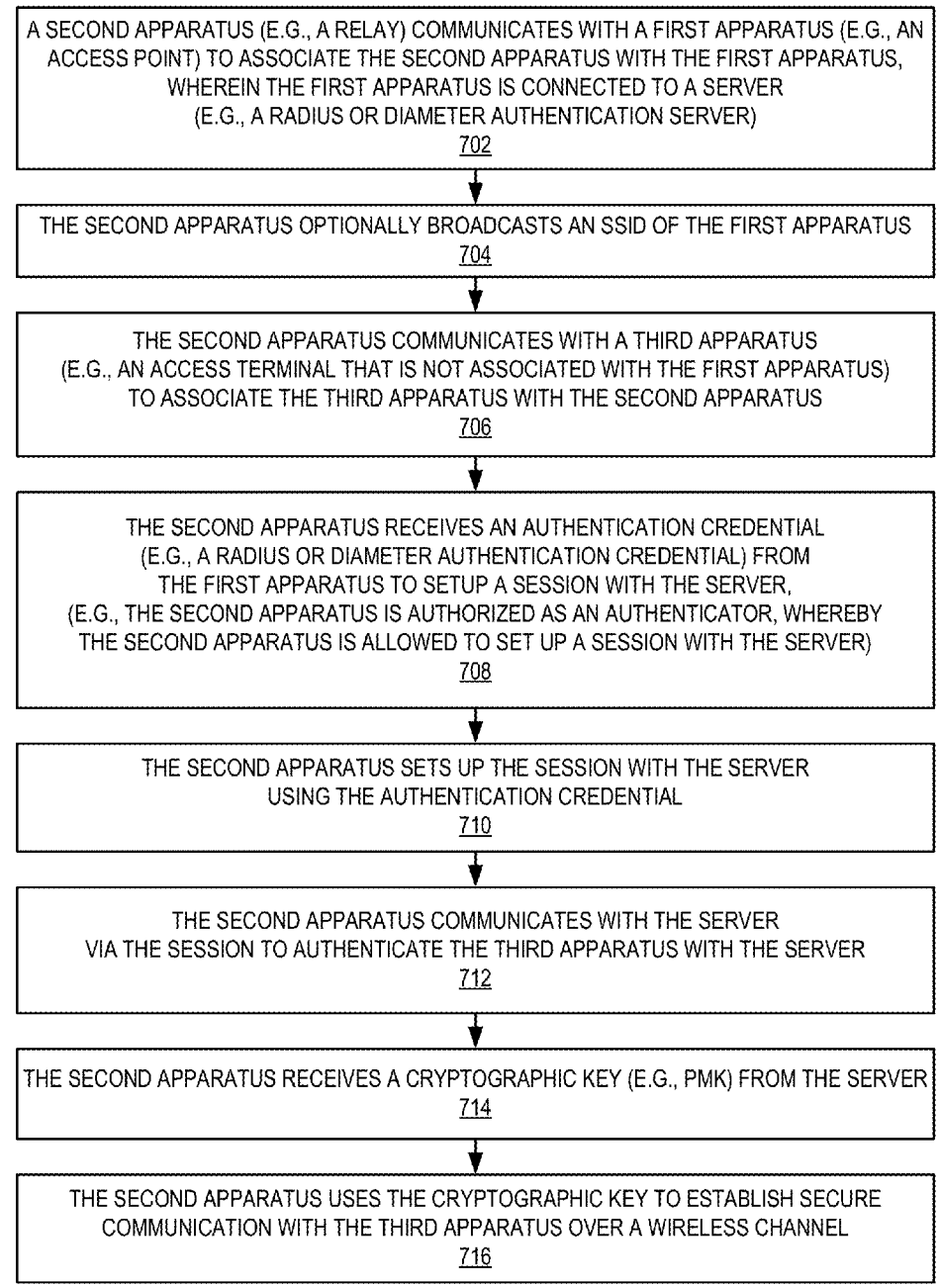
FIG. 7 is a flowchart of several sample aspects of operations relating to authentication in accordance with some aspects of the disclosure.

Referring to FIG. 7, in some aspects, this flowchart describes sample operations that may be performed by a second apparatus in conjunction with enabling the second apparatus to be admitted as a client to a server. In some implementations, the second apparatus may comprise a relay or some other suitable type of node (e.g., an access point).

As represented by block 702, a second apparatus (e.g., a relay) communicates with a first apparatus (e.g., an access point) to associate the second apparatus with the first apparatus (e.g., via an association request and response), wherein the first apparatus is connected to a server. In some implementations, the server comprises a RADIUS or DIAMETER authentication server. Accordingly, the communication with the server may employ a RADIUS message or a DIAMETER message.

As represented by block 704, the second apparatus optionally broadcasts a service set identifier (SSID) of the first apparatus (e.g., in furtherance of relay operation).

As represented by block 706, the second apparatus communicates with a third apparatus (e.g., an access terminal that is not associated with the first apparatus) to associate the third apparatus with the second apparatus (e.g., via an association request and response).

As represented by block 708, the second apparatus receives an authentication credential (e.g., a RADIUS or DIAMETER authentication credential) from the first apparatus to setup a session with the server (e.g., the second apparatus is authorized as an authenticator, whereby the second apparatus is allowed to set up a session with the server).

As represented by block 710, the second apparatus sets up the session with the server using the authentication credential.

As represented by block 712, the second apparatus communicates with the server via the session to authenticate the third apparatus with the server.

As represented by block 714, the second apparatus receives a cryptographic key (e.g., PMK) from the server.

As represented by block 716, the second apparatus uses the cryptographic key to establish secure communication with the third apparatus over a wireless channel.

Referring now to FIGS. 8-11, the second technique for supporting relay authentication and other relay-relayed operations will be described.

Figure 8:
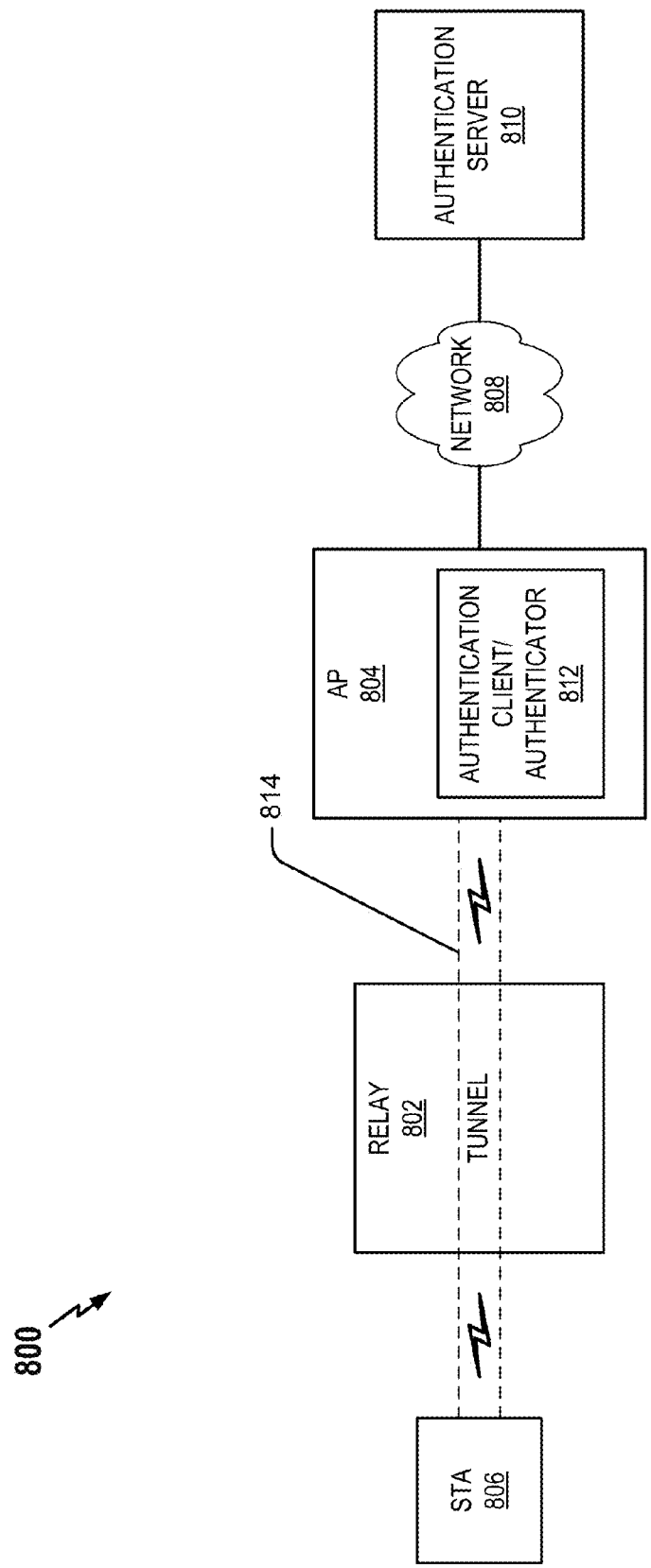
FIG. 8 illustrates an example where authentication messages are tunneled through a relay in accordance with some aspects of the disclosure.

FIG. 8 illustrates a wireless network 800 where authentication messages are tunneled through a relay 802. Similar to FIG. 1, the simplified example of FIG. 8 illustrates an AP 804, a STA 806, a network 808, and an authentication server 810. The AP 804 includes an authentication client (e.g., a RADIUS client) 812 for authenticating any STAs that are in direct communication with the AP 804 and/or that are in direct communication with the relay 802.

Conventionally, Extensible Authentication Protocol over Local Area Network (EAPOL) frames are not allowed to be propagated beyond one hop. In accordance with the teachings herein, the AP 804 is configured as the 802.1x authenticator for the STA 806, while the relay 802 is configured to tunnel EAPOL frames between the AP 804 and the STA 806. The 4-way handshake for establishing a secure wireless channel is based on the Media Access Control (MAC) addresses of the STA 806 and the AP 804. Consequently, encryption and decryption are performed between the AP 804 and the STA 806. As a result, the relay 802 will generally not be able to decrypt the tunneled MAC packet.

Figure 9:
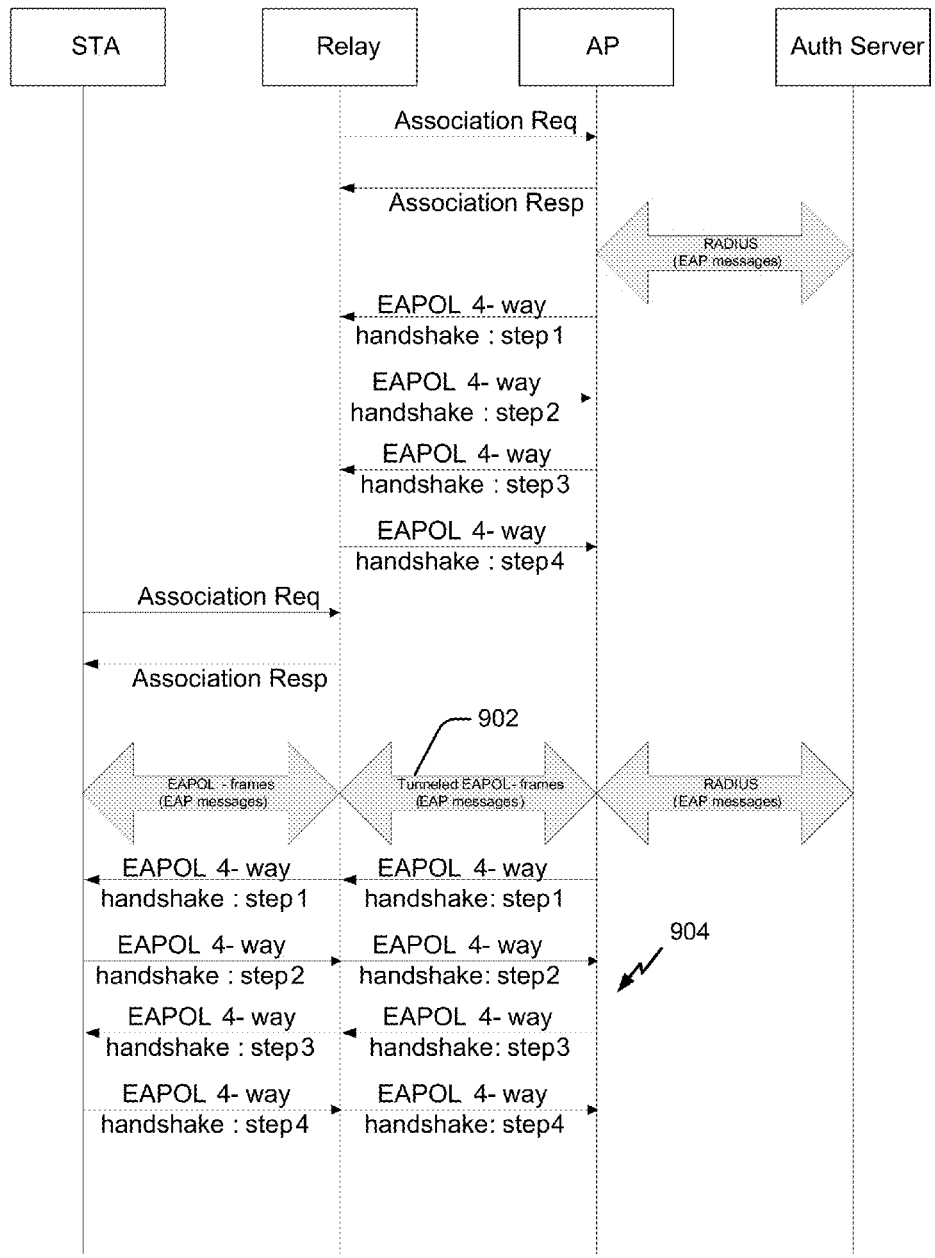
FIG. 9 illustrates an example of a scheme for relay tunneling in accordance with some aspects of the disclosure.

FIG. 9 depicts an example of message flow that may be employed in conjunction with such a tunneling scheme. As indicated, a relay associates with an AP, and these nodes establish secure communication over a wireless channel. In addition, a STA (that is not associated with the AP) associates with the relay. In this case, the relay tunnels EAPOL frames 902 between the STA and the AP (e.g., via a tunnel 814 as indicated in FIG. 8). FIG. 9 also illustrates tunneling of the 4-way handshake messages 904 (tunneled EAPOL frames) between the STA and the AP.

In some aspects, the tunneled EAPOL frames have the properties that follow. A four-address format is used where, for each hop, the addresses include a destination address (DA), a source address (DA), a transmitter address (TA), a receiver address (RA). This four-address format preserves the end STA's MAC address, even though there is a relay between the AP and the STA. For the uplink, DA is set to the AP's MAC address and SA is set to the STA's MAC address. As discussed below, TA may be set to the STA's MAC address or the relay's MAC address, depending on whether the message is being received or transmitted by the relay. In addition, RA may be set to the relay's MAC address or the AP's MAC address, depending on whether the message is being received or transmitted by the relay. Conversely, for the downlink, DA is set to the STA's MAC address and SA is set to the AP's MAC address. TA may be set to the AP's MAC address or the relay's MAC address, depending on whether the message is being received or transmitted by the relay. In addition, RA may be set to the relay's MAC address or the STA's MAC address, depending on whether the message is being received or transmitted by the relay. In some implementations, the relay will forward EAPOL packets that are received through an 802.1x uncontrolled port.

Referring to FIG. 10, in some aspects, this flowchart describes sample operations that may be performed by a first apparatus in conjunction with communicating with a third apparatus via a second apparatus (e.g., that tunnels messages between the first apparatus and the third apparatus). In some implementations, the first apparatus may comprise an access point or some other suitable type of node (e.g., an access terminal or a relay), the second apparatus may comprise a relay or some other suitable type of node, and the third apparatus may comprise an access terminal or some other suitable type of node (e.g., a relay or an access point).

As represented by block 1002, a first apparatus (e.g., an access point or access terminal) communicates with a second apparatus (e.g., a relay) to associate the second apparatus with the first apparatus (e.g., via an association request and response).

As represented by block 1004, the first apparatus commences communication with a third apparatus (e.g., an access terminal or access point) via the second apparatus, wherein the third apparatus is associated with the second apparatus but not the first apparatus.

As represented by block 1006, the first apparatus communicates with the third apparatus via the second apparatus using a message (e.g., EAPOL frame) comprising a source address, a destination address, a transmitter address, and a receiver address. For example, a downlink message may comprise a source address associated with the first apparatus, a destination address associated with the third apparatus, a transmitter address associated with the first apparatus, and a receiver address associated with the second apparatus. In addition, an uplink message may comprise a source address associated with the third apparatus, a destination address associated with the first apparatus, a transmitter address associated with the second apparatus, and a receiver address associated with the first apparatus. In some aspects, the addresses may comprise MAC addresses.

As represented by block 1008, the first apparatus obtains (e.g., derives) a cryptographic key (e.g., a pairwise transient key (PTK)) as a result of the communication with the third apparatus, wherein the obtaining of the cryptographic key is based on: the source address, the destination address, a nonce selected by the first apparatus, and a nonce selected by the third apparatus.

As represented by block 1010, the first apparatus uses the cryptographic key to establish secure communication with the third apparatus over a wireless channel.

Figure 11:
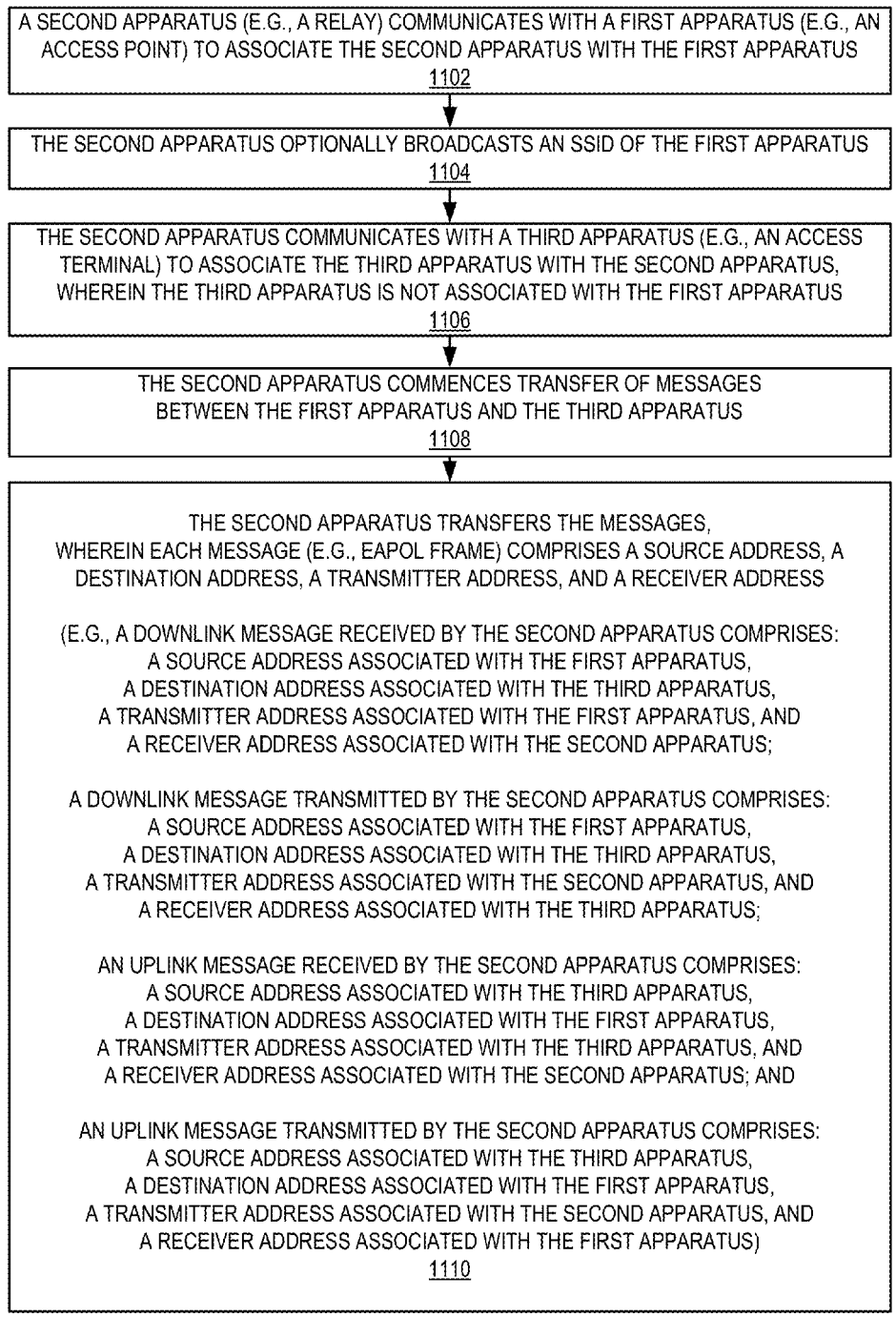
FIG. 11 is a flowchart of several sample aspects of operations relating to relay tunneling in accordance with some aspects of the disclosure.

Referring to FIG. 11, in some aspects, this flowchart describes sample operations that may be performed by a second apparatus that tunnels messages between a first apparatus and a third apparatus. In some implementations, the first apparatus may comprise an access point or some other suitable type of node (e.g., an access terminal or a relay), the second apparatus may comprise a relay or some other suitable type of node, and the third apparatus may comprise an access terminal or some other suitable type of node (e.g., a relay or an access point).

As represented by block 1102, a second apparatus (e.g., a relay) communicates with a first apparatus (e.g., an access point) to associate the second apparatus with the first apparatus (e.g., via an association request and response).

As represented by block 1104, the second apparatus optionally broadcasts an SSID of the first apparatus.

As represented by block 1106, the second apparatus communicates with a third apparatus (e.g., an access terminal) to associate the third apparatus with the second apparatus, wherein the third apparatus is not associated with the first apparatus.

As represented by block 1108, the second apparatus commences transfer of messages between the first apparatus and the third apparatus.

As represented by block 1110, the second apparatus transfers the messages, wherein each message (e.g., EAPOL frame) comprises a source address, a destination address, a transmitter address, and a receiver address. For example, a downlink message received by the second apparatus may comprise: a source address associated with the first apparatus, a destination address associated with the third apparatus, a transmitter address associated with the first apparatus, and a receiver address associated with the second apparatus. In addition, a downlink message transmitted by the second apparatus may comprise: a source address associated with the first apparatus, a destination address associated with the third apparatus, a transmitter address associated with the second apparatus, and a receiver address associated with the third apparatus. Also, an uplink message received by the second apparatus may comprise: a source address associated with the third apparatus, a destination address associated with the first apparatus, a transmitter address associated with the third apparatus, and a receiver address associated with the second apparatus. Further, an uplink message transmitted by the second apparatus may comprise: a source address associated with the third apparatus, a destination address associated with the first apparatus, a transmitter address associated with the second apparatus, and a receiver address associated with the first apparatus. In some aspects, the addresses may comprise MAC addresses. In some aspects, the transferring of the messages may comprise receiving the messages via an IEEE 802.1x uncontrolled port.

Referring now to FIGS. 12-15, the third technique for supporting relay authentication and other relay-related operations will be described.

Figure 12:
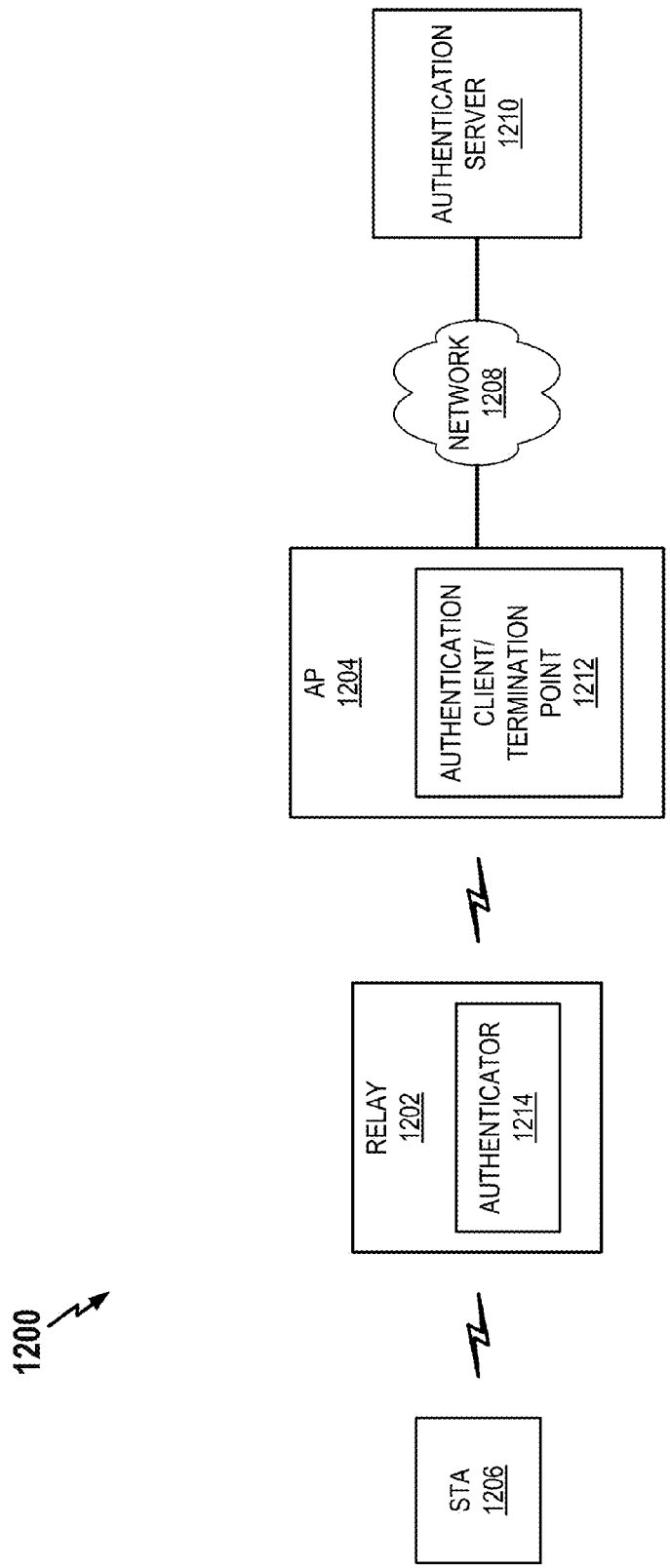
FIG. 12 illustrates an example where a relay serves as an authenticator in accordance with some aspects of the disclosure.

FIG. 12 illustrates a wireless network 1200 with a hybrid implementation where a relay 1202 is an authenticator 1214, but an AP 1204 is the termination point for an authentication server 1210 (e.g., a RADIUS server). That is, an authentication client 1212 of the AP 1204 communicates with the authentication server 1210 (e.g., to obtain a pairwise master key for communicating with a STA 1206). The relay does not include an authentication client in this case. However, signaling is defined between the AP 1204 and the relay 1202 to carry the authentication (e.g., RADIUS) messages between the AP 1204 and a STA 1206. Thus, the relay 1202 can serve as the authenticator for the STA 1206 (e.g., for access to the network 1208), without employing a full authentication client at the relay 1202.

This implementation may be employed, for example, in scenarios where it is desirable for the relay to decrypt a packet. For example, if a data packet were destined for the relay, the relay would preferably be able to decrypt the packet. If it cannot, the packet would instead be forwarded to the AP, and then the AP will send it back (decrypted) to the relay. In accordance with the teachings herein, this additional traversal may be avoided by allowing the relay to decrypt the packet sent by the STA or other devices. This has additional benefits that the relay doesn't have to host RADIUS client software, thereby freeing up memory resources at the relay. In addition, the structure of the EAPOL frames is not modified in this implementation.

Figure 13:
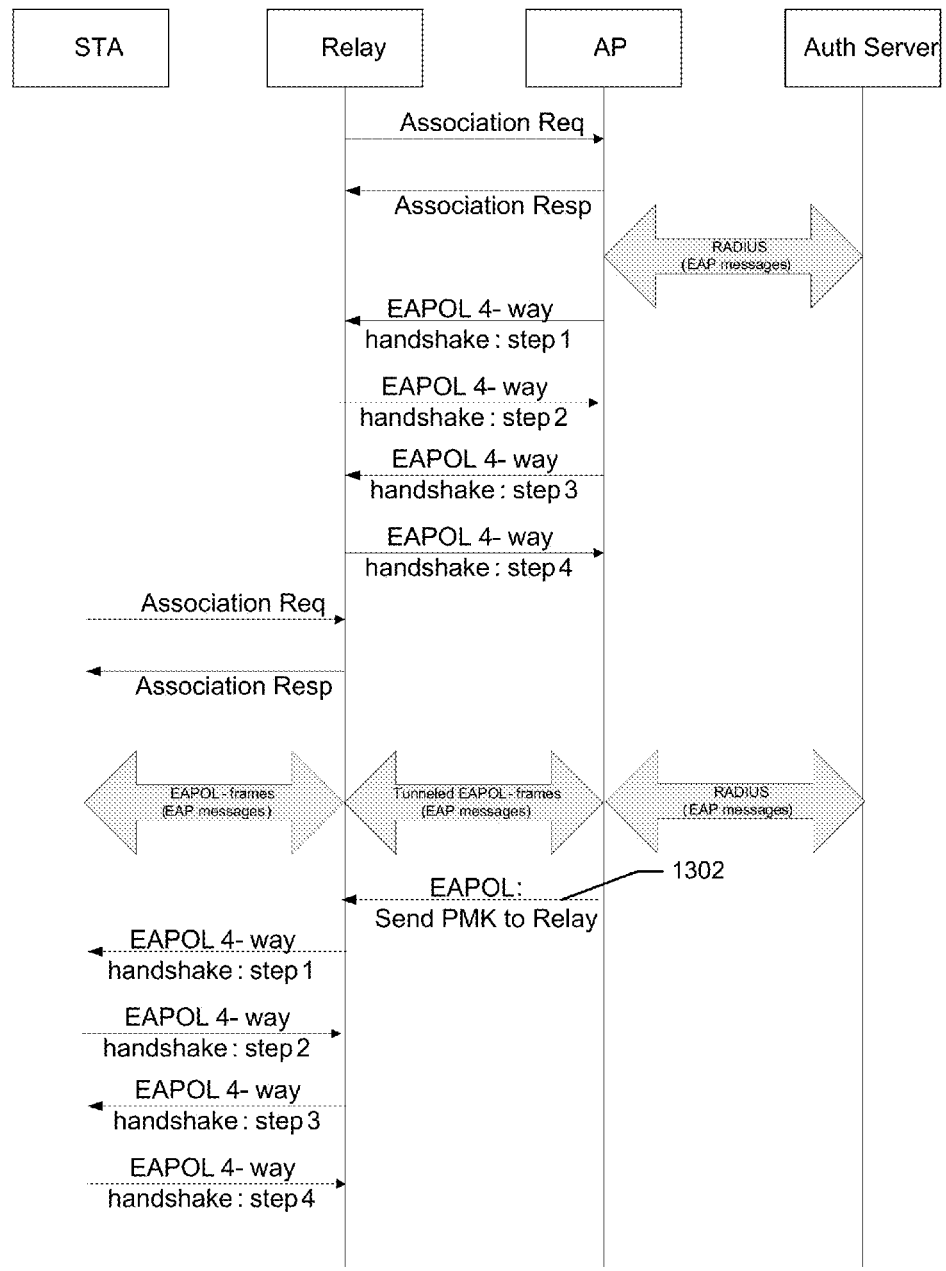
FIG. 13 illustrates an example of a scheme for authentication in accordance with some aspects of the disclosure.

As shown in the message flow of FIG. 13, a message 1302 (e.g., comprising a frame) carries the pairwise master key (PMK) associated with the STA (that the RADIUS server previously sent to the AP) from the AP to the relay. In this case, it may be seen that the relay handles two different types of EAPOL messages. First, the relay tunnels EAPOL frames (comprising EAP messages) between the AP and the STA. In addition, the relay receives an EAPOL message comprising the PMK from the AP.

Figure 14:
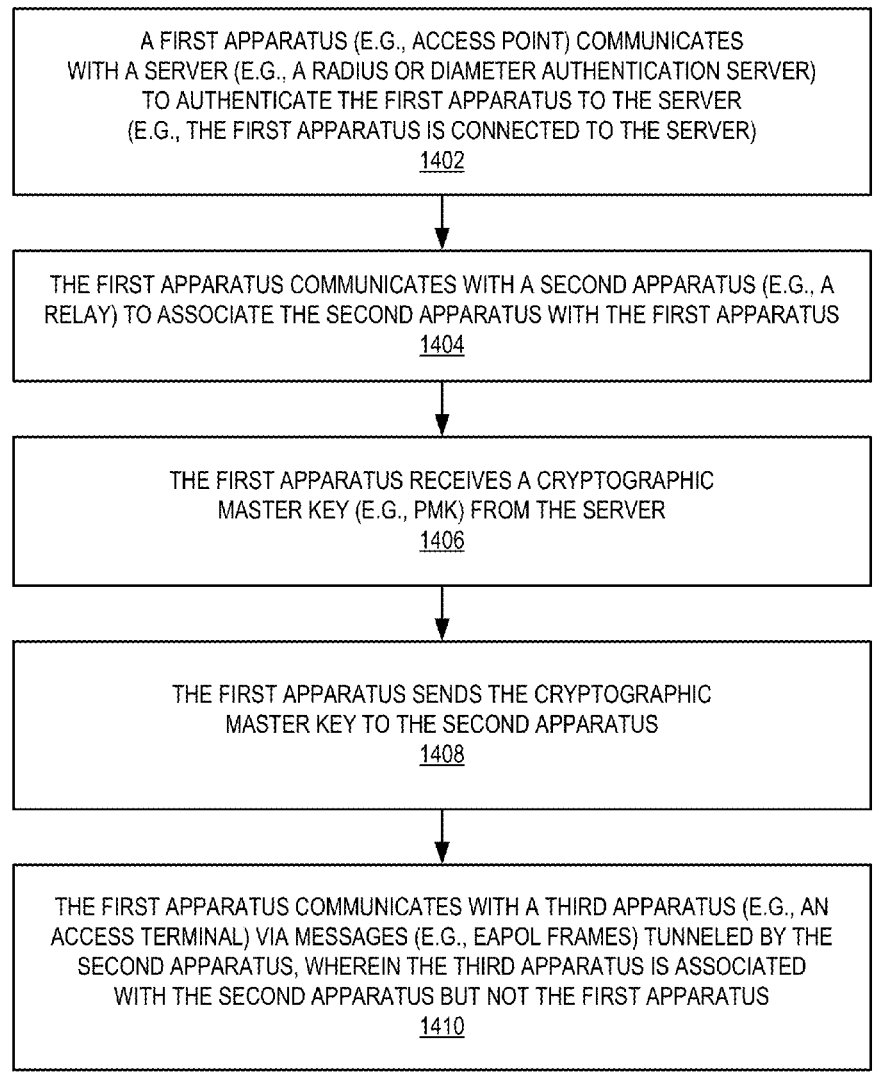
FIG. 14 is a flowchart of several sample aspects of operations relating to authentication in accordance with some aspects of the disclosure.

Referring to FIG. 14, in some aspects, this flowchart describes sample operations that may be performed by a first apparatus in conjunction with communicating a cryptographic key to a second apparatus. In some implementations, the first apparatus may comprise an access point or some other suitable type of node (e.g., a relay), while the second apparatus may comprise a relay or some other suitable type of node.

As represented by block 1402, a first apparatus (e.g., access point) communicates with a server (e.g., a RADIUS or DIAMETER authentication server) to authenticate the first apparatus to the server (e.g., the first apparatus is connected to the server).

As represented by block 1404, the first apparatus communicates with a second apparatus (e.g., a relay) to associate the second apparatus with the first apparatus (e.g., via an association request and response).

As represented by block 1406, the first apparatus receives a cryptographic master key (e.g., PMK) from the server.

As represented by block 1408, the first apparatus sends the cryptographic master key to the second apparatus. In some aspects, the cryptographic master key may be sent to the second apparatus via an EAPOL message.

As represented by block 1410, the first apparatus communicates with a third apparatus (e.g., an access terminal) via messages (e.g., EAPOL frames) tunneled by the second apparatus, wherein the third apparatus is associated with the second apparatus but not the first apparatus.

Figure 15:
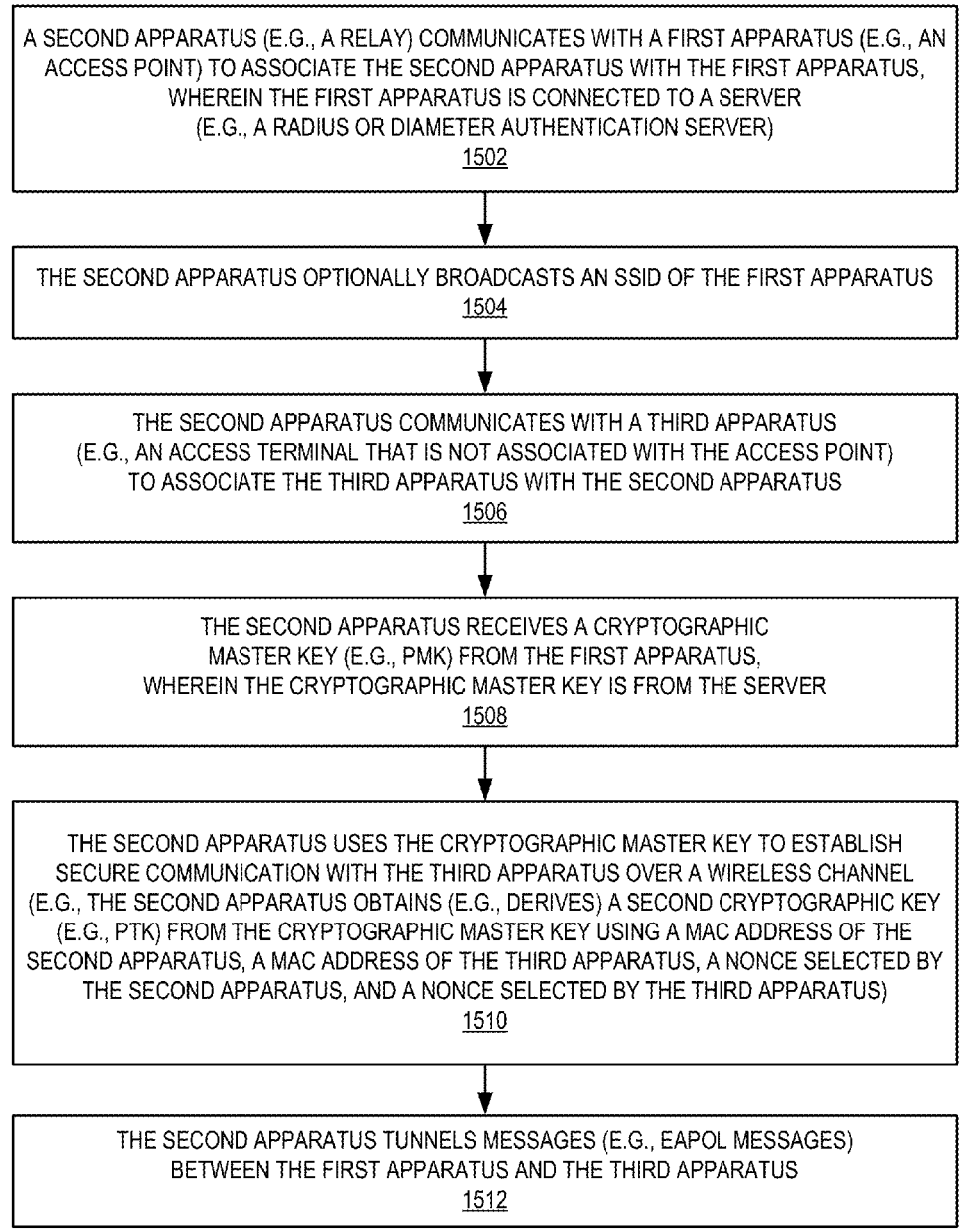
FIG. 15 is a flowchart of several sample aspects of operations relating to authentication in accordance with some aspects of the disclosure.

Referring to FIG. 15, in some aspects, this flowchart describes sample operations that may be performed by a second apparatus in conjunction with receiving a cryptographic key from a first apparatus. In some implementations, the first apparatus may comprise an access point or some other suitable type of node (e.g., a relay), while the second apparatus may comprise a relay or some other suitable type of node.

As represented by block 1502, a second apparatus (e.g., a relay) communicates with a first apparatus (e.g., an access point) to associate the second apparatus with the first apparatus, wherein the first apparatus is connected to a server (e.g., a RADIUS or DIAMETER authentication server).

As represented by block 1504, the second apparatus optionally broadcasts an SSID of the first apparatus.

As represented by block 1506, the second apparatus communicates with a third apparatus (e.g., an access terminal that is not associated with the access point) to associate the third apparatus with the second apparatus (e.g., via an association request and response).

As represented by block 1508, the second apparatus receives a cryptographic master key (e.g., PMK) from the first apparatus, wherein the cryptographic master key is from the server. In some aspects, the cryptographic master key may be received via an EAPOL message.

As represented by block 1510, the second apparatus uses the cryptographic master key to establish secure communication with the third apparatus over a wireless channel. For example, the second apparatus may obtain (e.g., derive) a second cryptographic key (e.g., PTK) from the cryptographic master key using a MAC address of the second apparatus, a MAC address of the third apparatus, a nonce selected by the second apparatus, and a nonce selected by the third apparatus. In some aspects, the communication with the third apparatus may employ EAPOL.

As represented by block 1512, the second apparatus tunnels messages (e.g., EAPOL messages) between the first apparatus and the third apparatus.

With the above in mind, FIGS. 16-22 illustrate sample operations that may be performed by various apparatuses as taught herein.

Figure 16:
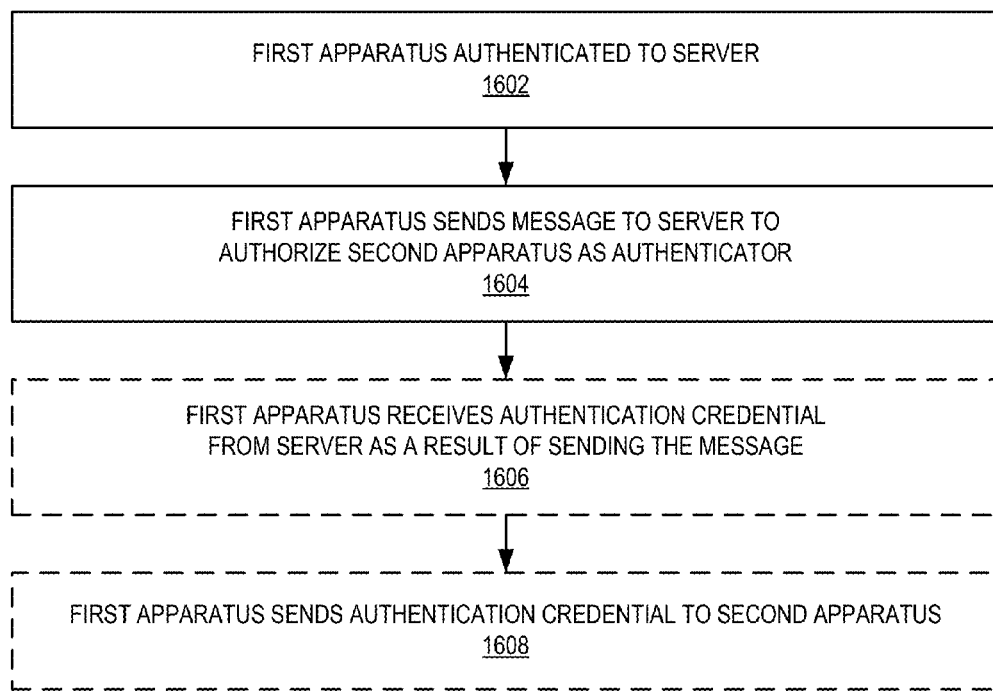
FIG. 16 is a flowchart of several sample aspects of operations relating to authentication in accordance with some aspects of the disclosure.

Referring initially to FIG. 16, in some aspects, this flowchart describes sample operations that may be performed by a first apparatus in conjunction with enabling a second apparatus to be admitted as a client to a server. In some implementations, the first apparatus may comprise an access point or some other suitable type of node (e.g., a relay), while the second apparatus may comprise a relay or some other suitable type of node.

As represented by block 1602, the first apparatus (e.g., access point) authenticates to a server. In some aspects, the message may comprise a request to admit the second apparatus as a client of the server.

In some aspects, the server may comprise an authentication server such as a RADIUS server or a DIAMETER server. Accordingly, the message may comprise a RADIUS message or a DIAMETER message.

The first apparatus may receive an authentication credential from the server as a result of sending the message. In some aspects, this authentication credential may be for setting up a session between the server and the second apparatus. In some aspects, the authentication credential may comprise a RADIUS authentication credential or a DIAMETER authentication credential.

As represented by block 1604, the first apparatus sends a message (e.g., a RADIUS or DIAMETER message) to the server to authorize a second apparatus (e.g., a relay) as an authenticator. For example, the first apparatus may send an authentication credential that was received from the server to the second apparatus.

As represented by optional block 1606, the first apparatus may receive an authentication credential from the server as a result of sending the message at block 1602.

As represented by optional block 1608, the first apparatus may send the authentication credential to the second apparatus.

Further to the above, the first apparatus may receive a cryptographic master key from the server. In this case, the first apparatus may send the cryptographic master key to the second apparatus. In some aspects, the cryptographic master key may comprise a pairwise master key.

Figure 17:
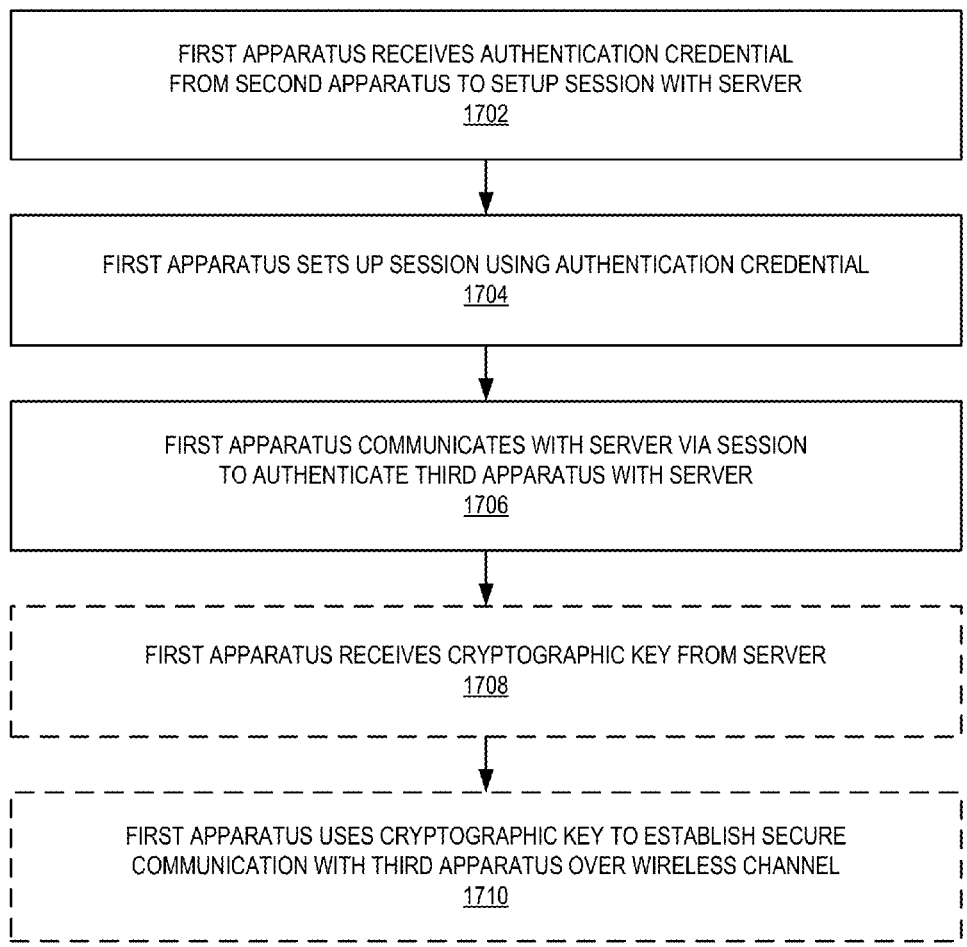
FIG. 17 is a flowchart of several sample aspects of operations relating to authentication in accordance with some aspects of the disclosure.

Referring to FIG. 17, in some aspects, this flowchart describes sample operations that may be performed by a first apparatus in conjunction with enabling the first apparatus to be admitted as a client to a server. In some implementations, the first apparatus may comprise a relay or some other suitable type of node (e.g., an access point).

As represented by block 1702, the first apparatus (e.g., a relay) receives an authentication credential from a second apparatus (e.g., an access point) to setup a session with a server. In some aspects, the authentication credential may comprise a RADIUS authentication credential or a DIAMETER authentication credential.

In some aspects, the server may comprise an authentication server such as a RADIUS server or a DIAMETER server. Accordingly, the communication with the server may employ a RADIUS message or a DIAMETER message.

As represented by block 1704, the first apparatus sets up the session with the server using the authentication credential.

As represented by block 1706, the first apparatus communicates with the server via the session to authenticate a third apparatus (e.g., a STA) with the server.

As represented by optional block 1708, the first apparatus may receive a cryptographic key from the server.

As represented by optional block 1710, the first apparatus may use the cryptographic key to establish secure communication with the third apparatus over a wireless channel.

Further to the above, the first apparatus may receive a cryptographic master key from the second device, where the key was generated by the server for the second apparatus. In this case, the first apparatus may use the cryptographic master key to establish secure communication with the third apparatus over a wireless channel. In some aspects, the cryptographic master key may comprise a pairwise master key.

Figure 18:
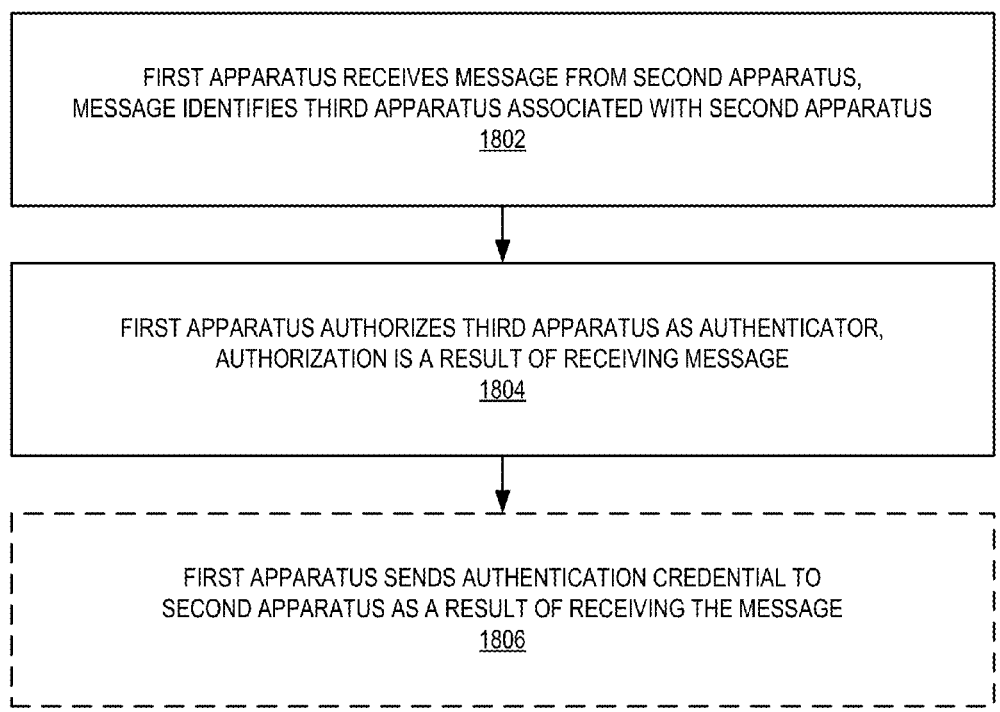
FIG. 18 is a flowchart of several sample aspects of operations relating to authentication in accordance with some aspects of the disclosure.

Referring to FIG. 18, in some aspects, this flowchart describes sample operations that may be performed by a first apparatus in conjunction with enabling a third apparatus to be admitted as a client to the server. In some implementations, the first apparatus may comprise a server (e.g., an authentication server). In some implementations, the third apparatus may comprise a relay or some other suitable type of node (e.g., an access point).

As represented by block 1802, the first apparatus receives a message (e.g., a RADIUS or DIAMETER message) from a second apparatus (e.g., an AP). This message identifies a third apparatus (e.g., a relay) associated with the second apparatus. In some aspects, the message may comprise a request to admit the second apparatus as a client of the first apparatus (e.g., server).

As represented by block 1804, the first apparatus authorizes the third apparatus as an authenticator as a result of receiving the message at block 1802.

As represented by optional block 1806, the first apparatus may send an authentication credential to the second apparatus as a result of receiving the message. In some aspects, the authentication credential may be for setting up a session between the first apparatus and the third apparatus.

Further to the above, the first apparatus may establish a session with a fourth apparatus (e.g., a STA) associated with the third apparatus. In this case, the first apparatus may obtain a cryptographic key associated with the session and send the cryptographic key to the third apparatus to enable the third apparatus and the fourth apparatus to establish secure communication over a wireless channel.

Figure 19:
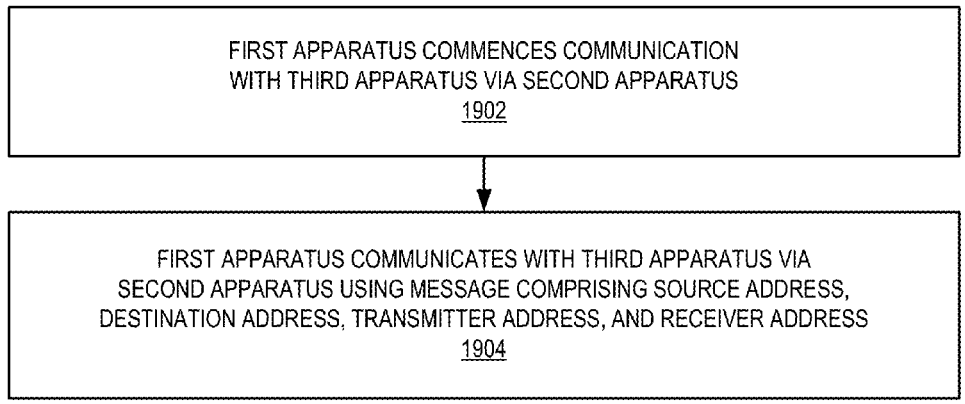
FIG. 19 is a flowchart of several sample aspects of operations relating to authentication in accordance with some aspects of the disclosure.

Referring to FIG. 19, in some aspects, this flowchart describes sample operations that may be performed by a first apparatus in conjunction with communicating with a third apparatus via a second apparatus (e.g., that tunnels messages between the first apparatus and the third apparatus). In some implementations, the first apparatus may comprise an access point or some other suitable type of node, the second apparatus may comprise a relay or some other suitable type of node, and the third apparatus may comprise an access terminal or some other suitable type of node.

As represented by block 1902, the first apparatus commences communication with a third apparatus via the second apparatus. Here, the third apparatus is associated with the second apparatus but not the first apparatus.

As represented by block 1904, the first apparatus communicates with the third apparatus via the second apparatus using a message comprising a source address, a destination address, a transmitter address, and a receiver address. For example, a downlink message may comprise a source address associated with the first apparatus, a destination address associated with the third apparatus, a transmitter address associated with the first apparatus, and a receiver address associated with the second apparatus. In addition, an uplink message may comprise a source address associated with the third apparatus, a destination address associated with the first apparatus, a transmitter address associated with the second apparatus, and a receiver address associated with the first apparatus. In some aspects, the message may comprise an EAPOL frame. In some aspects, the addresses may comprise Media Access Control (MAC) addresses.

Further to the above, the first apparatus may obtain a cryptographic key as a result of the communication with the third apparatus. Here, the obtaining of the cryptographic key is based on: the source address, the destination address, a nonce selected by the first apparatus, and a nonce selected by the third apparatus. In this case, the first apparatus may use the cryptographic key to establish secure communication with the third apparatus over a wireless channel.

Figure 20:
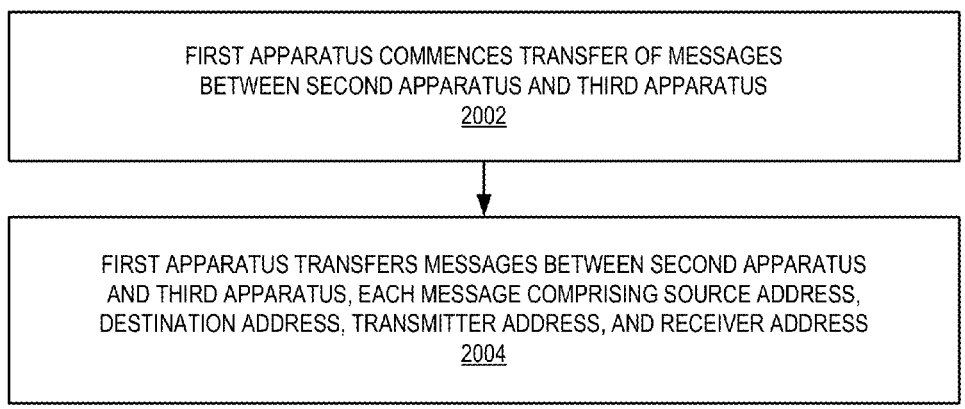
FIG. 20 is a flowchart of several sample aspects of operations relating to authentication in accordance with some aspects of the disclosure.

Referring to FIG. 20, in some aspects, this flowchart describes sample operations that may be performed by a first apparatus that tunnels messages between a second apparatus and a third apparatus. In some implementations, the first apparatus may comprise a relay or some other suitable type of node, the second apparatus may comprise an access point or some other suitable type of node, and the third apparatus may comprise an access terminal or some other suitable type of node.

As represented by block 2002, the first apparatus commences transfer of messages between the second apparatus and the third apparatus. In some aspects, the messages may comprise Extensible Authentication Protocol over Local Area Network (EAPOL) frames. In some aspects, the transferring of the messages may comprise receiving the messages via an IEEE 802.1x uncontrolled port.

As represented by block 2004, the first apparatus transfers the messages, wherein each message comprises a source address, a destination address, a transmitter address, and a receiver address. For example, a downlink message received by the second apparatus may comprise: a source address of the downlink message is associated with the first apparatus; a destination address of the downlink message is associated with the third apparatus; a transmitter address of the downlink message is associated with the first apparatus; and a receiver address of the downlink message is associated with the second apparatus. In addition, a downlink message transmitted by the second apparatus may comprise: a source address of the downlink message is associated with the first apparatus; a destination address of the downlink message is associated with the third apparatus; a transmitter address of the downlink message is associated with the second apparatus; and a receiver address of the downlink message is associated with the third apparatus. Also, an uplink message received by the second apparatus may comprise: a source address of the uplink message is associated with the third apparatus; a destination address of the uplink message is associated with the first apparatus; a transmitter address of the uplink message is associated with the second apparatus; and a receiver address of the uplink message is associated with the first apparatus. Further, an uplink message transmitted by the second apparatus may comprise: a source address of the uplink message is associated with the third apparatus; a destination address of the uplink message is associated with the first apparatus; a transmitter address of the uplink message is associated with the third apparatus; and a receiver address of the uplink message is associated with the second apparatus.

Figure 21:
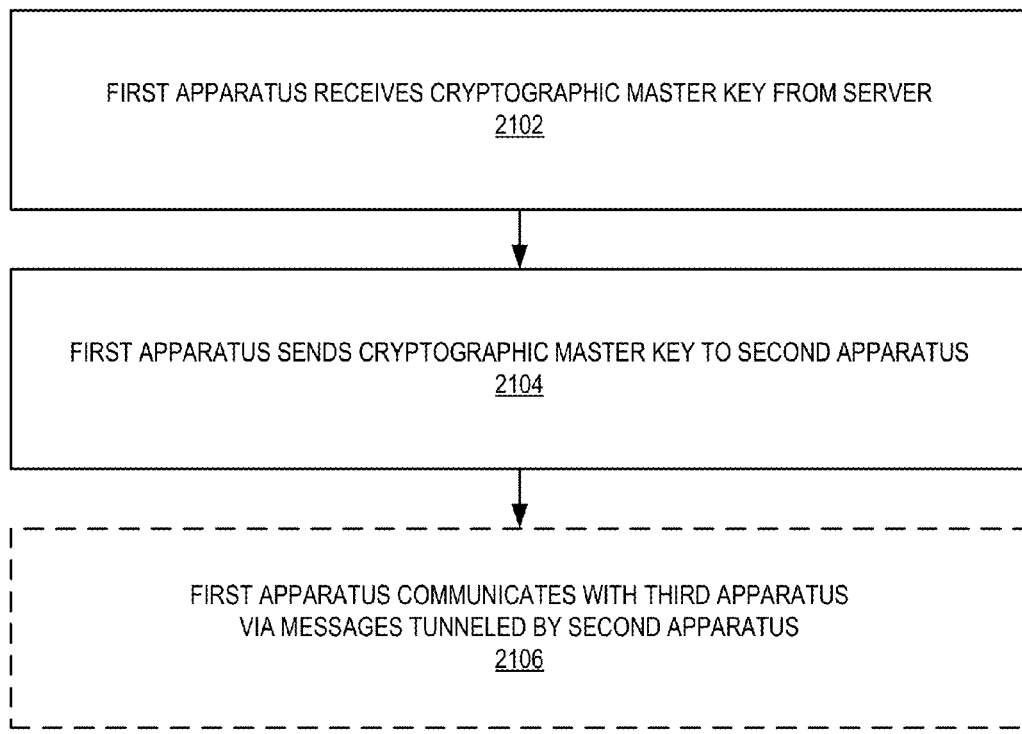
FIG. 21 is a flowchart of several sample aspects of operations relating to authentication in accordance with some aspects of the disclosure.

Referring to FIG. 21, in some aspects, this flowchart describes sample operations that may be performed by a first apparatus in conjunction with communicating a cryptographic key to a second apparatus. In some implementations, the first apparatus may comprise an access point or some other suitable type of node (e.g., a relay), while the second apparatus may comprise a relay or some other suitable type of node.

As represented by block 2102, the first apparatus receives a cryptographic master key (e.g., PMK) from the server. In some aspects, the server may comprise a RADIUS server or a DIAMETER server.

As represented by block 2104, the first apparatus sends the cryptographic master key to the second apparatus. In some aspects, the cryptographic master key may be sent to the second apparatus via an EAPOL message.

As represented by optional block 2106, the first apparatus may communicate with a third apparatus (e.g., an access terminal) via messages (e.g., EAPOL frames) tunneled by the second apparatus. Here, the third apparatus is associated with the second apparatus but not the first apparatus.

Figure 22:
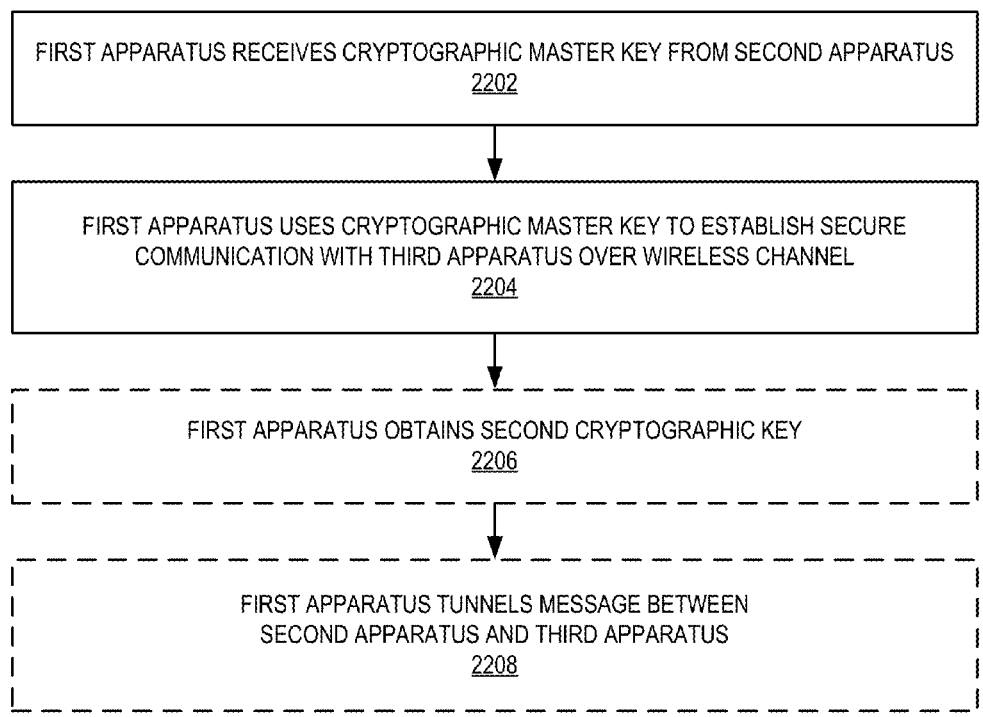
FIG. 22 is a flowchart of several sample aspects of operations relating to authentication in accordance with some aspects of the disclosure.

Referring to FIG. 22, in some aspects, this flowchart describes sample operations that may be performed by a first apparatus in conjunction with receiving a cryptographic key from a second apparatus. In some implementations, the first apparatus may comprise a relay or some other suitable type of node, while the second apparatus may comprise an access point or some other suitable type of node (e.g., a relay).

As represented by block 2202, the first apparatus receives a cryptographic master key (e.g., PMK) from the second apparatus. In some aspects, the cryptographic master key may be originally generated by a server. In some aspects, the server may comprise a RADIUS server or a DIAMETER server.

As represented by block 2204, the first apparatus uses the cryptographic master key to establish secure communication with a third apparatus (e.g., an access terminal) over a wireless channel. In some aspects, the communication with the third apparatus employs EAPOL.

As represented by optional block 2206, the first apparatus may obtain (e.g., derive) a second cryptographic key (e.g., PTK) from the cryptographic master key. For example, the second cryptographic key may be derived based on a MAC address of the first apparatus, a MAC address of the third apparatus, a nonce selected by the first apparatus, and a nonce selected by the third apparatus.

As represented by optional block 2208, the first apparatus may tunnel messages (e.g., EAPOL messages) between the second apparatus and the third apparatus.

Figure 23:
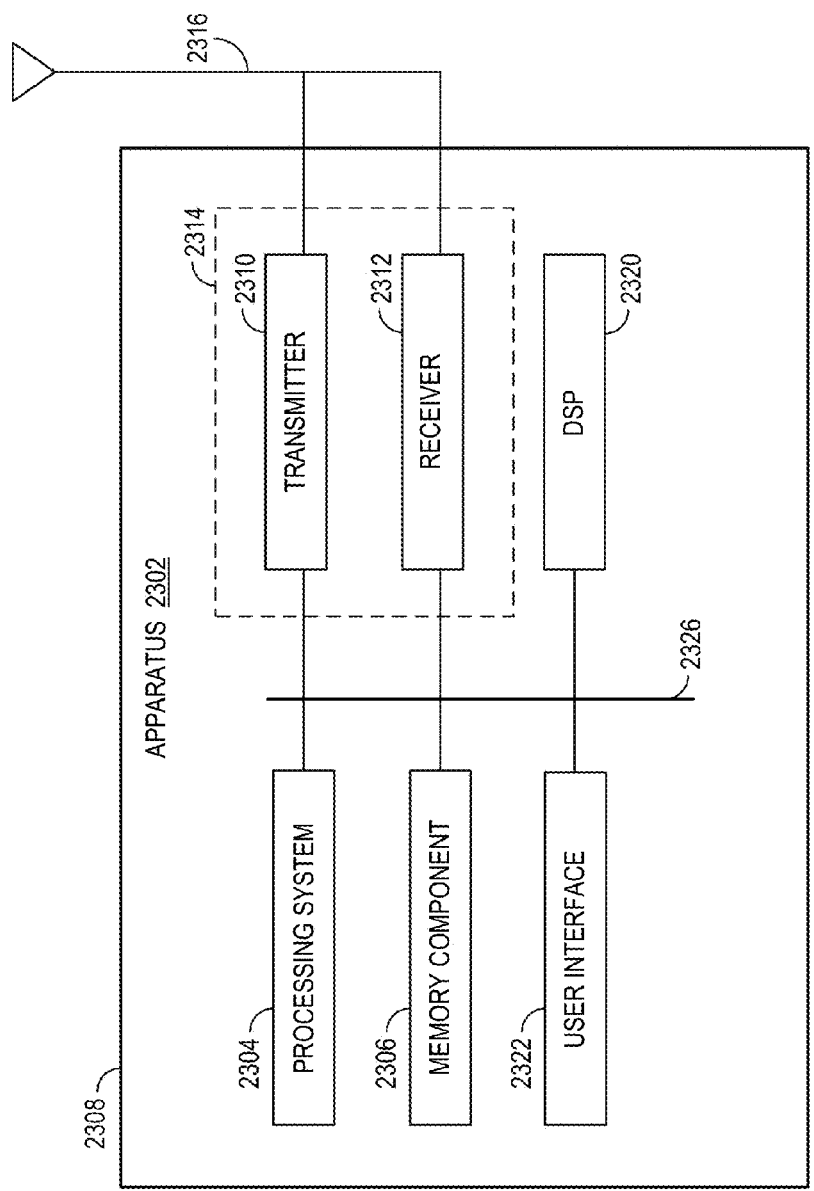
FIG. 23 is a functional block diagram of an exemplary apparatus that may be employed within a wireless communication system in accordance with some aspects of the disclosure.

FIG. 23 illustrates various components that may be utilized in an apparatus 2302 (e.g., a wireless device) that may be employed within the wireless communication system 200. The apparatus 2302 is an example of a device that may be configured to implement the various methods described herein. For example, the apparatus 2302 may comprise the AP 204, a relay 206d, or one of the STAs 206 of FIG. 2.

The apparatus 2302 may include a processing system 2304 that controls operation of the apparatus 2302. The processing system 2304 may also be referred to as a central processing unit (CPU). A memory component 2306 (e.g., including a memory device), which may include both read-only memory (ROM) and random access memory (RAM), provides instructions and data to the processing system 2304. A portion of the memory component 2306 may also include non-volatile random access memory (NVRAM). The processing system 2304 typically performs logical and arithmetic operations based on program instructions stored within the memory component 2306. The instructions in the memory component 2306 may be executable to implement the methods described herein.

When the apparatus 2302 is implemented or used as a transmitting node, the processing system 2304 may be configured to select one of a plurality of media access control (MAC) header types, and to generate a packet having that MAC header type. For example, the processing system 2304 may be configured to generate a packet comprising a MAC header and a payload and to determine what type of MAC header to use.

When the apparatus 2302 is implemented or used as a receiving node, the processing system 2304 may be configured to process packets of a plurality of different MAC header types. For example, the processing system 2304 may be configured to determine the type of MAC header used in a packet and process the packet and/or fields of the MAC header.

The processing system 2304 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The apparatus 2302 may also include a housing 2308 that may include a transmitter 2310 and a receiver 2312 to allow transmission and reception of data between the apparatus 2302 and a remote location. The transmitter 2310 and receiver 2312 may be combined into single communication device (e.g., a transceiver 2314). An antenna 2316 may be attached to the housing 2308 and electrically coupled to the transceiver 2314. The apparatus 2302 may also include (not shown) multiple transmitters, multiple receivers, multiple transceivers, and/or multiple antennas. A transmitter 2310 and a receiver 2312 may comprise an integrated device (e.g., embodied as a transmitter circuit and a receiver circuit of a single communication device) in some implementations, may comprise a separate transmitter device and a separate receiver device in some implementations, or may be embodied in other ways in other implementations.

The transmitter 2310 may be configured to wirelessly transmit packets having different MAC header types. For example, the transmitter 2310 may be configured to transmit packets with different types of headers generated by the processing system 2304, discussed above.

The receiver 2312 may be configured to wirelessly receive packets having different MAC header type. In some aspects, the receiver 2312 is configured to detect a type of a MAC header used and process the packet accordingly.

The receiver 2312 may be used to detect and quantify the level of signals received by the transceiver 2314. The receiver 2312 may detect such signals as total energy, energy per subcarrier per symbol, power spectral density and other signals. The apparatus 2302 may also include a digital signal processor (DSP) 2320 for use in processing signals. The DSP 2320 may be configured to generate a data unit for transmission. In some aspects, the data unit may comprise a physical layer data unit (PPDU). In some aspects, the PPDU is referred to as a packet.

The apparatus 2302 may further comprise a user interface 2322 in some aspects. The user interface 2322 may comprise a keypad, a microphone, a speaker, and/or a display. The user interface 2322 may include any element or component that conveys information to a user of the apparatus 2302 and/or receives input from the user.

The various components of the apparatus 2302 may be coupled together by a bus system 2326. The bus system 2326 may include a data bus, for example, as well as a power bus, a control signal bus, and a status signal bus in addition to the data bus. Those of skill in the art will appreciate the components of the apparatus 2302 may be coupled together or accept or provide inputs to each other using some other mechanism.

Although a number of separate components are illustrated in FIG. 23, one or more of the components may be combined or commonly implemented. For example, the processing system 2304 may be used to implement not only the functionality described above with respect to the processing system 2304, but also to implement the functionality described above with respect to the transceiver 2314 and/or the DSP 2320. Further, each of the components illustrated in FIG. 23 may be implemented using a plurality of separate elements. Furthermore, the processing system 2304 may be used to implement any of the components, modules, circuits, or the like described below, or each may be implemented using a plurality of separate elements.

For ease of reference, when the apparatus 2302 is configured as a transmitting node, it is hereinafter referred to as an apparatus 2302t. Similarly, when the apparatus 2302 is configured as a receiving node, it is hereinafter referred to as an apparatus 2302r. A device in the wireless communication system 200 may implement only functionality of a transmitting node, only functionality of a receiving node, or functionality of both a transmitting node and a receive node.

As discussed above, the apparatus 2302 may comprise an AP 204 or a STA 206, and may be used to transmit and/or receive communication having a plurality of MAC header types.

The components of FIG. 23 may be implemented in various ways. In some implementations, the components of FIG. 23 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 23 may be implemented by processor and memory component(s) of the apparatus (e.g., by execution of appropriate code and/or by appropriate configuration of processor components). It should be appreciated that these components may be implemented in different types of apparatuses in different implementations (e.g., in an ASIC, in a system-on-a-chip (SoC), etc.).

Figure 24:
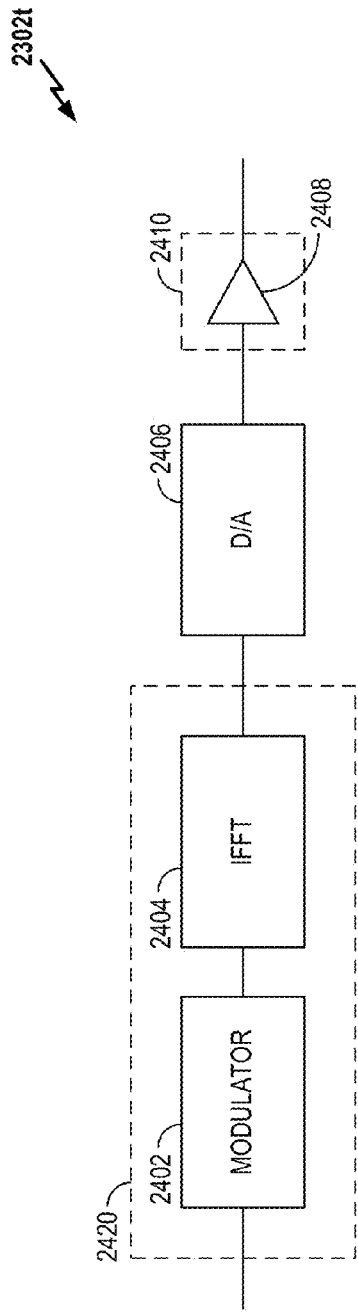
FIG. 24 is a functional block diagram of exemplary components that may be utilized in the apparatus of FIG. 23 to transmit wireless communication.

As discussed above, the apparatus 2302 may comprise an AP 204 or a STA 206, a relay, or some other type of apparatus, and may be used to transmit and/or receive communication. FIG. 24 illustrates various components that may be utilized in the apparatus 2302t to transmit wireless communication. The components illustrated in FIG. 24 may be used, for example, to transmit OFDM communication. In some aspects, the components illustrated in FIG. 24 are used to generate and transmit packets to be sent over a bandwidth of less than or equal to 1 MHz.

The apparatus 2302t of FIG. 24 may comprise a modulator 2402 configured to modulate bits for transmission. For example, the modulator 2402 may determine a plurality of symbols from bits received from the processing system 2304 (FIG. 23) or the user interface 2322 (FIG. 23), for example by mapping bits to a plurality of symbols according to a constellation. The bits may correspond to user data or to control information. In some aspects, the bits are received in codewords. In one aspect, the modulator 2402 comprises a QAM (quadrature amplitude modulation) modulator, for example a 16-QAM modulator or a 64-QAM modulator. In other aspects, the modulator 2402 comprises a binary phase-shift keying (BPSK) modulator or a quadrature phase-shift keying (QPSK) modulator.

The apparatus 2302t may further comprise a transform module 2404 configured to convert symbols or otherwise modulated bits from the modulator 2402 into a time domain. In FIG. 24, the transform module 2404 is illustrated as being implemented by an inverse fast Fourier transform (IFFT) module. In some implementations, there may be multiple transform modules (not shown) that transform units of data of different sizes. In some implementations, the transform module 2404 may be itself configured to transform units of data of different sizes. For example, the transform module 2404 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 2404 may be referred to as the size of the transform module 2404.

In FIG. 24, the modulator 2402 and the transform module 2404 are illustrated as being implemented in the DSP 2420. In some aspects, however, one or both of the modulator 2402 and the transform module 2404 are implemented in the processing system 2304 or in another element of the apparatus 2302t (e.g., see description above with reference to FIG. 23).

As discussed above, the DSP 2420 may be configured to generate a data unit for transmission. In some aspects, the modulator 2402 and the transform module 2404 may be configured to generate a data unit comprising a plurality of fields including control information and a plurality of data symbols.

Returning to the description of FIG. 24, the apparatus 2302t may further comprise a digital to analog converter 2406 configured to convert the output of the transform module into an analog signal. For example, the time-domain output of the transform module 2406 may be converted to a baseband OFDM signal by the digital to analog converter 2406. The digital to analog converter 2406 may be implemented in the processing system 2304 or in another element of the apparatus 2302 of FIG. 23. In some aspects, the digital to analog converter 2406 is implemented in the transceiver 2314 (FIG. 23) or in a data transmit processor.

The analog signal may be wirelessly transmitted by the transmitter 2410. The analog signal may be further processed before being transmitted by the transmitter 2410, for example by being filtered or by being upconverted to an intermediate or carrier frequency. In the aspect illustrated in FIG. 24, the transmitter 2410 includes a transmit amplifier 2408. Prior to being transmitted, the analog signal may be amplified by the transmit amplifier 2408. In some aspects, the amplifier 2408 comprises a low noise amplifier (LNA).

The transmitter 2410 is configured to transmit one or more packets or data units in a wireless signal based on the analog signal. The data units may be generated using the processing system 2304 (FIG. 23) and/or the DSP 2420, for example using the modulator 2402 and the transform module 2404 as discussed above. Data units that may be generated and transmitted as discussed above are described in additional detail below.

Figure 25:
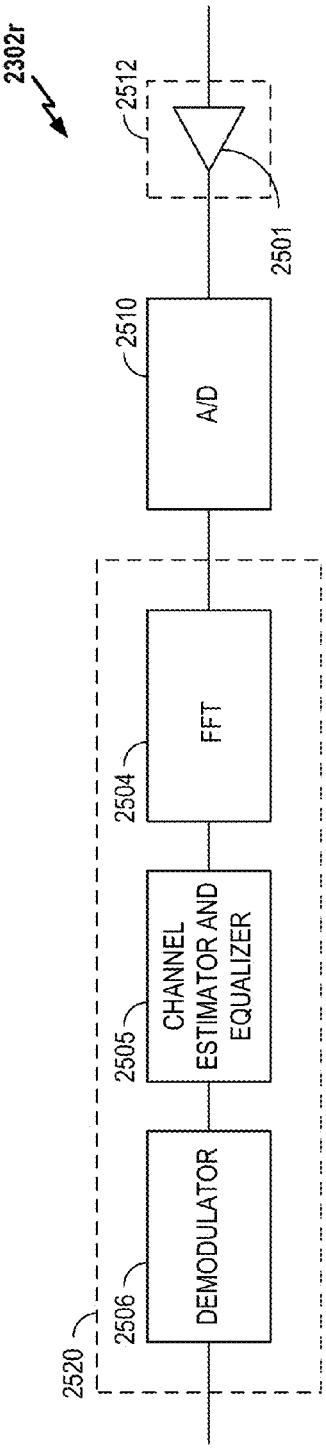
FIG. 25 is a functional block diagram of exemplary components that may be utilized in the apparatus of FIG. 23 to receive wireless communication.

FIG. 25 illustrates various components that may be utilized in the apparatus 2302 of FIG. 23 to receive wireless communication. The components illustrated in FIG. 25 may be used, for example, to receive OFDM communication. For example, the components illustrated in FIG. 25 may be used to receive data units transmitted by the components discussed above with respect to FIG. 24.

The receiver 2512 of apparatus 2302r is configured to receive one or more packets or data units in a wireless signal. Data units that may be received and decoded or otherwise processed as discussed below.

In the aspect illustrated in FIG. 25, the receiver 2512 includes a receive amplifier 2501. The receive amplifier 2501 may be configured to amplify the wireless signal received by the receiver 2512. In some aspects, the receiver 2512 is configured to adjust the gain of the receive amplifier 2501 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 2501 comprises an LNA.

The apparatus 2302r may comprise an analog to digital converter 2510 configured to convert the amplified wireless signal from the receiver 2512 into a digital representation thereof. Further to being amplified, the wireless signal may be processed before being converted by the digital to analog converter 2510, for example by being filtered or by being downconverted to an intermediate or baseband frequency. The analog to digital converter 2510 may be implemented in the processing system 2304 (FIG. 23) or in another element of the apparatus 2302r. In some aspects, the analog to digital converter 2510 is implemented in the transceiver 2314 (FIG. 23) or in a data receive processor.

The apparatus 2302r may further comprise a transform module 2504 configured to convert the representation of the wireless signal into a frequency spectrum. In FIG. 25, the transform module 2504 is illustrated as being implemented by a fast Fourier transform (FFT) module. In some aspects, the transform module may identify a symbol for each point that it uses. As described above with reference to FIG. 24, the transform module 2504 may be configured with a plurality of modes, and may use a different number of points to convert the signal in each mode. The number of points used by the transform module 2504 may be referred to as the size of the transform module 2504. In some aspects, the transform module 2504 may identify a symbol for each point that it uses.

The apparatus 2302r may further comprise a channel estimator and equalizer 2505 configured to form an estimate of the channel over which the data unit is received, and to remove certain effects of the channel based on the channel estimate. For example, the channel estimator 2505 may be configured to approximate a function of the channel, and the channel equalizer may be configured to apply an inverse of that function to the data in the frequency spectrum.

The apparatus 2302r may further comprise a demodulator 2506 configured to demodulate the equalized data. For example, the demodulator 2506 may determine a plurality of bits from symbols output by the transform module 2504 and the channel estimator and equalizer 2505, for example by reversing a mapping of bits to a symbol in a constellation. The bits may be processed or evaluated by the processing system 2304 (FIG. 23), or used to display or otherwise output information to the user interface 2322 (FIG. 23). In this way, data and/or information may be decoded. In some aspects, the bits correspond to codewords. In one aspect, the demodulator 2506 comprises a QAM (quadrature amplitude modulation) demodulator, for example a 16-QAM demodulator or a 64-QAM demodulator. In other aspects, the demodulator 2506 comprises a binary phase-shift keying (BPSK) demodulator or a quadrature phase-shift keying (QPSK) demodulator.

In FIG. 25, the transform module 2504, the channel estimator and equalizer 2505, and the demodulator 2506 are illustrated as being implemented in the DSP 2520. In some aspects, however, one or more of the transform module 2504, the channel estimator and equalizer 2505, and the demodulator 2506 are implemented in the processing system 2304 (FIG. 23) or in another element of the apparatus 2302 (FIG. 23).

As discussed above, the wireless signal received at the receiver 2312 comprises one or more data units. Using the functions or components described above, the data units or data symbols therein may be decoded evaluated or otherwise evaluated or processed. For example, the processing system 2304 (FIG. 23) and/or the DSP 2520 may be used to decode data symbols in the data units using the transform module 2504, the channel estimator and equalizer 2505, and the demodulator 2506.

Data units exchanged by the AP 204 and the STA 206 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The apparatus 2302t shown in FIG. 24 shows an example of a single transmit chain to be transmitted over an antenna. The apparatus 2302r shown in FIG. 25 shows an example of a single receive chain to be received over an antenna. In some implementations, the apparatus 2302t or 2302r may implement a portion of a MIMO system using multiple antennas to simultaneously transmit data.

The wireless network 200 may employ methods to allow efficient access of the wireless medium based on unpredictable data transmissions while avoiding collisions. As such, in accordance with various aspects, the wireless network 200 performs carrier sense multiple access/collision avoidance (CSMA/CA) that may be referred to as the Distributed Coordination Function (DCF). More generally, an apparatus 2302 having data for transmission senses the wireless medium to determine if the channel is already occupied. If the apparatus 2302 senses the channel is idle then the apparatus 2302 transmits prepared data. Otherwise, the apparatus 2302 may defer for some period before determining again whether or not the wireless medium is free for transmission. A method for performing CSMA may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than one that must wait longer before attempting to access the channel.

A wireless apparatus may include various components that perform functions based on signals that are transmitted by or received at the wireless apparatus. For example, in some implementations a wireless apparatus comprises a user interface configured to output an indication based on a received signal as taught herein.

A wireless apparatus as taught herein may communicate via one or more wireless communication links that are based on or otherwise support any suitable wireless communication technology. For example, in some aspects a wireless apparatus may associate with a network such as a local area network (e.g., a Wi-Fi network) or a wide area network. To this end, a wireless apparatus may support or otherwise use one or more of a variety of wireless communication technologies, protocols, or standards such as, for example, Wi-Fi, WiMAX, CDMA, TDMA, OFDM, and OFDMA. Also, a wireless apparatus may support or otherwise use one or more of a variety of corresponding modulation or multiplexing schemes. A wireless apparatus may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., nodes). In some aspects, an apparatus (e.g., a wireless apparatus) implemented in accordance with the teachings herein may comprise an access point, a relay, or an access terminal.

An access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

A relay may comprise, be implemented as, or known as a relay node, a relay device, a relay station, a relay apparatus, or some other similar terminology. As discussed above, in some aspects, a relay may comprise some access terminal functionality and some access point functionality.

In some aspects, a wireless apparatus comprises an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless apparatus also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communication (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

Figure 26:
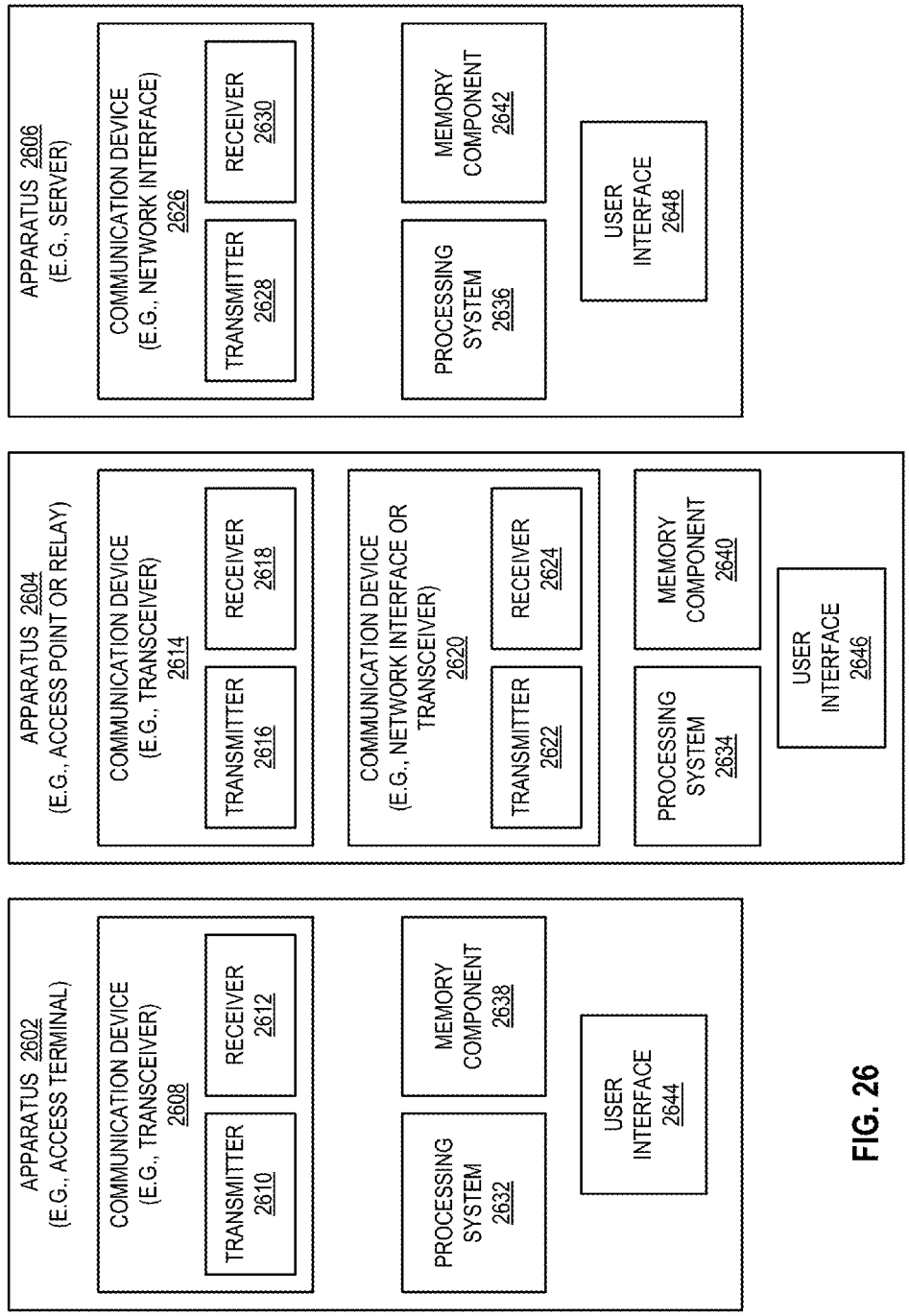
FIG. 26 is a simplified block diagram of several sample aspects of components that may be employed in communication nodes in accordance with some aspects of the disclosure.
Figure 27:
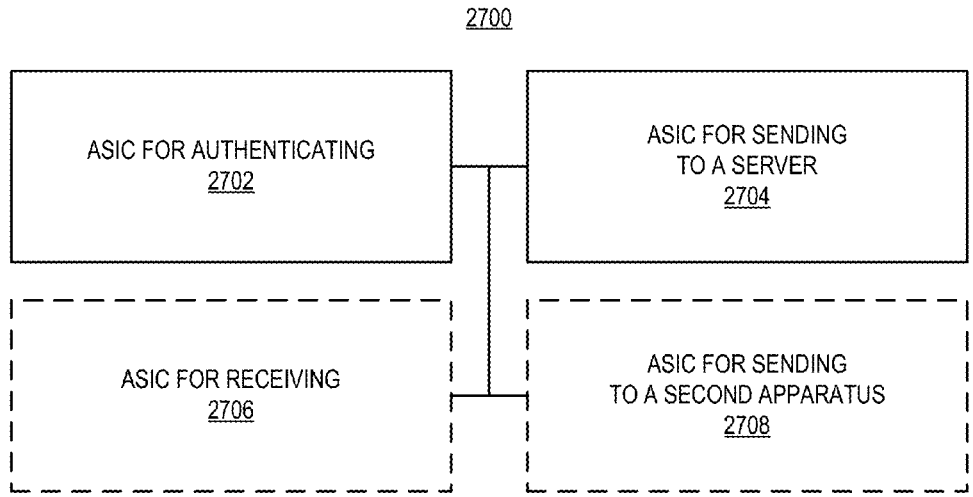
FIGS. 27-33 are simplified block diagrams of several sample aspects of apparatuses configured with functionality relating to the authentication and use of a relay in accordance with some aspects of the disclosure.
Figure 28:
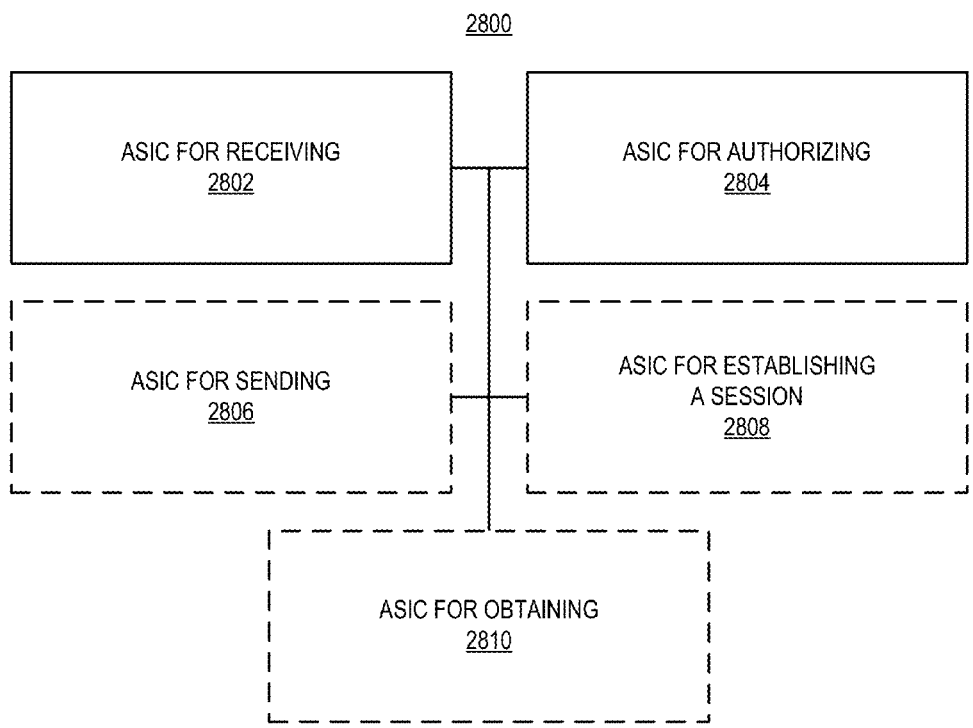
Figure 29:
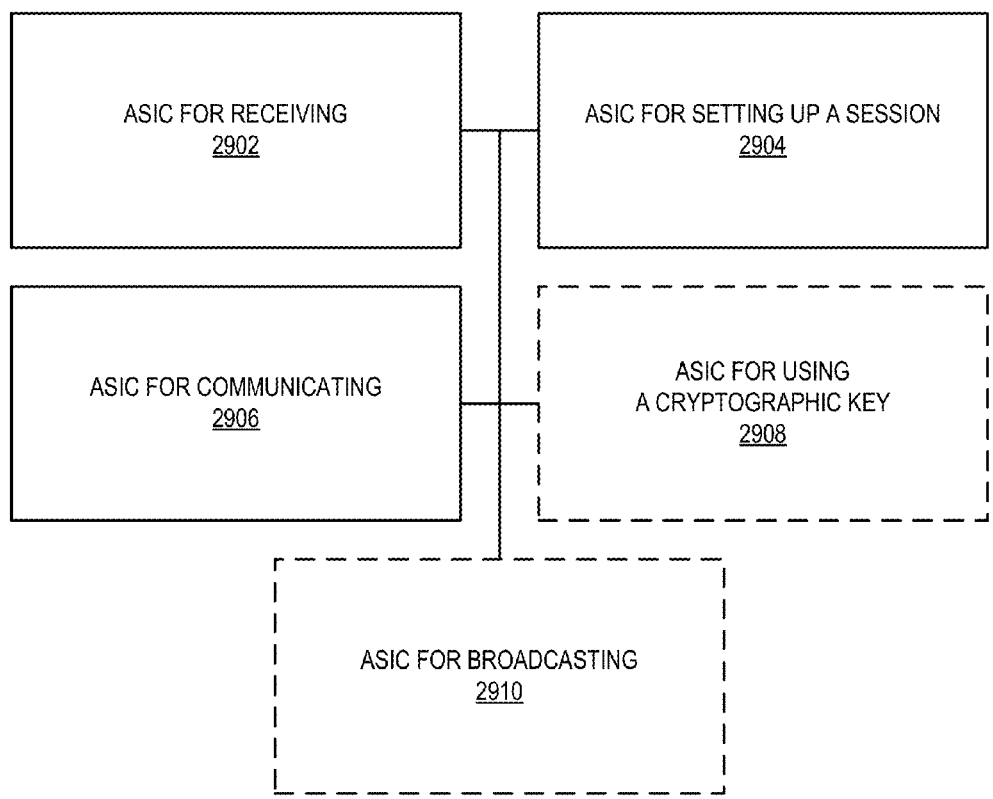
Figure 30:
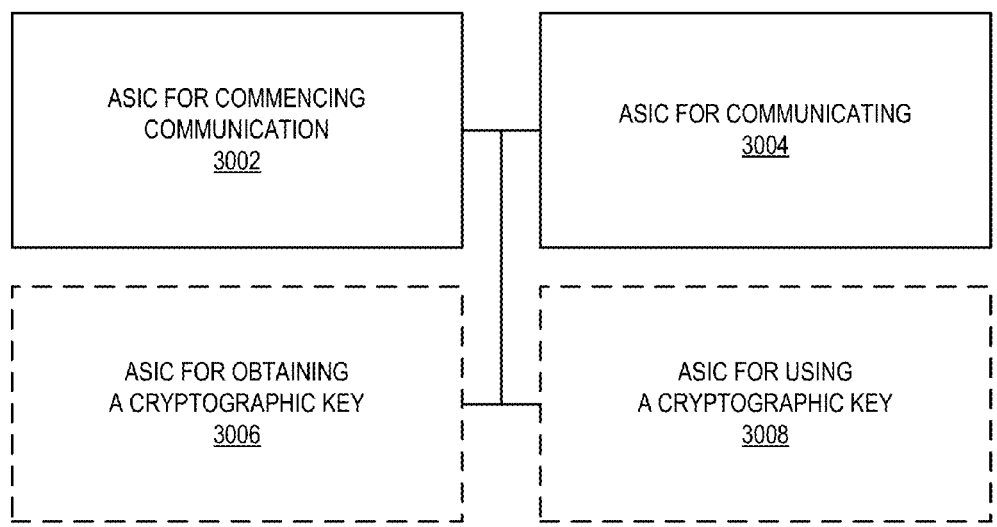
Figure 31:
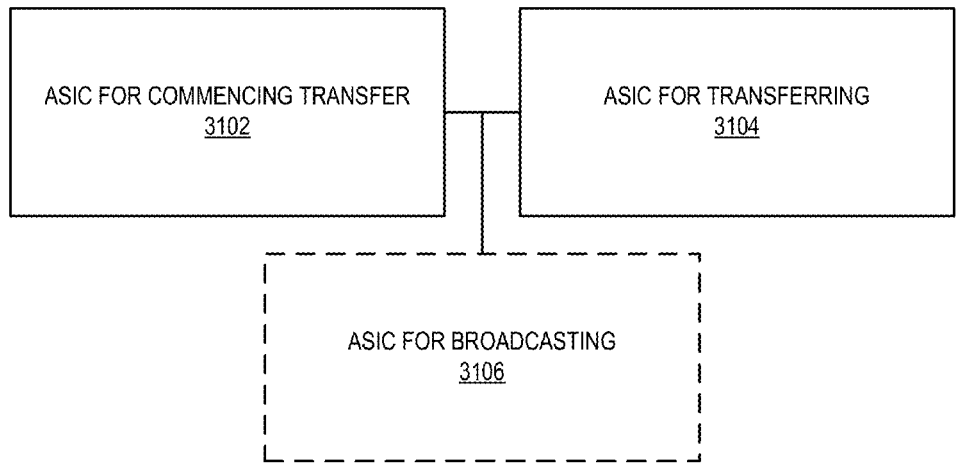
Figure 32:
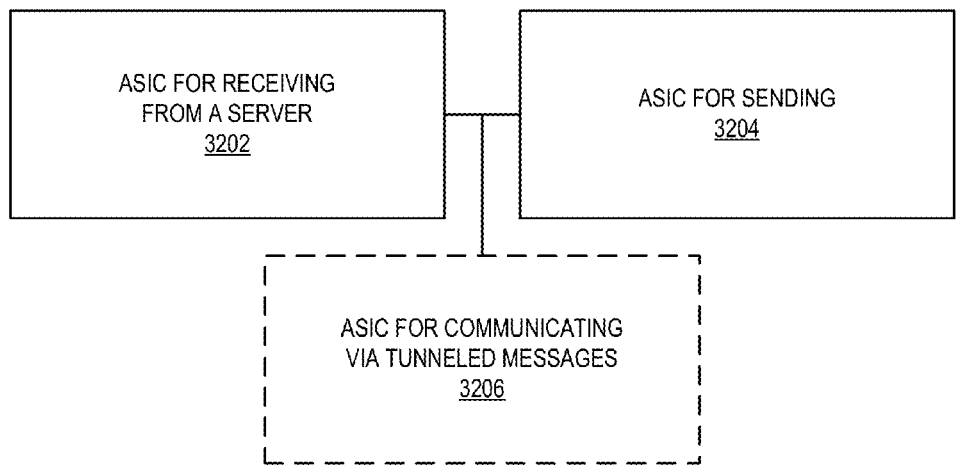
Figure 33:
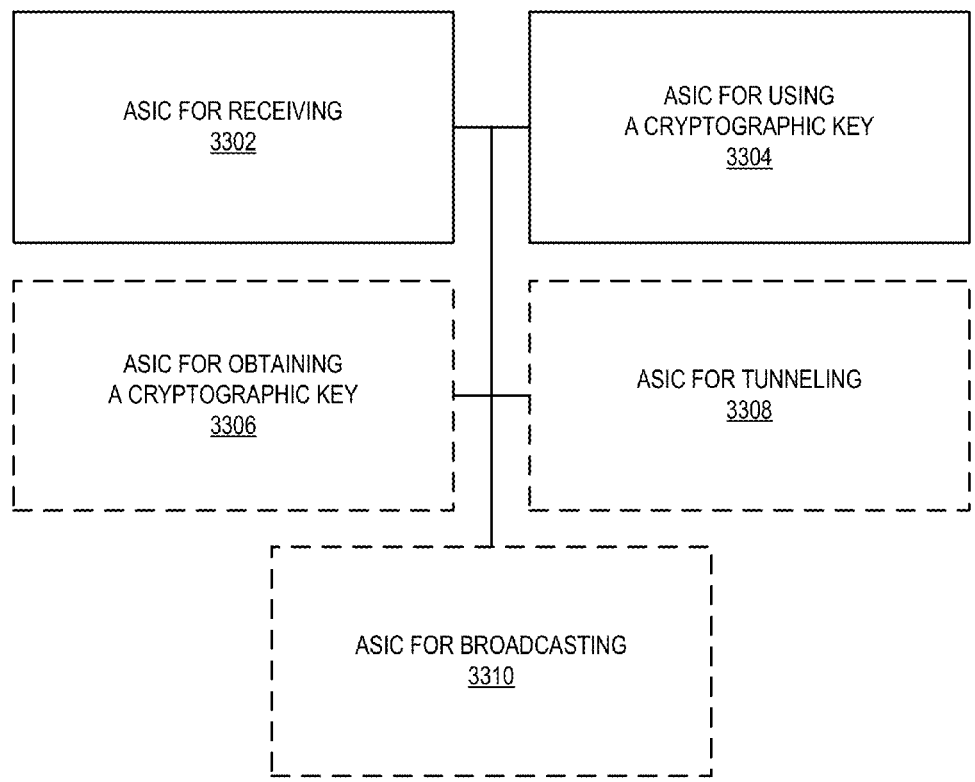

FIG. 26 illustrates several sample components (represented by corresponding blocks) that may be incorporated into an apparatus 2602, an apparatus 2604, and an apparatus 2606 (e.g., corresponding to an access terminal, an access point or relay, and a server, respectively) to perform communication operations as taught herein. It should be appreciated that these components may be implemented in different types of apparatuses in different implementations (e.g., in an ASIC, in a system on a chip (SoC), etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 2602 and the apparatus 2604 each include at least one wireless communication device (represented by the communication devices 2608 and 2614 (and the communication device 2620 if the apparatus 2604 is a relay)) for communicating with other nodes via at least one designated radio access technology. Each communication device 2608 includes at least one transmitter (represented by the transmitter 2610) for transmitting and encoding signals (e.g., messages, indications, information, and so on) and at least one receiver (represented by the receiver 2612) for receiving and decoding signals (e.g., messages, indications, information, pilots, and so on). Similarly, each communication device 2614 includes at least one transmitter (represented by the transmitter 2616) for transmitting signals (e.g., messages, indications, information, pilots, and so on) and at least one receiver (represented by the receiver 2618) for receiving signals (e.g., messages, indications, information, and so on). If the apparatus 2604 is a relay, each communication device 2620 includes at least one transmitter (represented by the transmitter 2622) for transmitting signals (e.g., messages, indications, information, pilots, and so on) and at least one receiver (represented by the receiver 2624) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 2604 comprises a network listen module.

The apparatus 2606 (and the apparatus 2604 if it is an access point) includes at least one communication device (represented by the communication device 2626 and, optionally, 2620) for communicating with other nodes. For example, the communication device 2626 may comprise a network interface that is configured to communicate with one or more network entities via a wire-based or wireless backhaul. In some aspects, the communication device 2626 may be implemented as a transceiver configured to support wire-based or wireless signal communication. This communication may involve, for example, sending and receiving: messages, parameters, or other types of information. Accordingly, in the example of FIG. 26, the communication device 2626 is shown as comprising a transmitter 2628 and a receiver 2630. Similarly, if the apparatus 2604 is an access point, the communication device 2620 may comprise a network interface that is configured to communicate with one or more network entities via a wire-based or wireless backhaul. As with the communication device 2626, the communication device 2620 is shown as comprising a transmitter 2622 and a receiver 2624.

The apparatuses 2602, 2604, and 2606 also include other components that may be used in conjunction with communication operations as taught herein. The apparatuses 2602, 2604, and 2606 include processing systems 2632, 2634, and 2636, respectively, for providing functionality relating to relay authentication and associated relay-related operations and for providing other processing functionality. The apparatuses 2602, 2604, and 2606 include memory devices 2638, 2640, and 2642 (e.g., each including a memory device), respectively, for maintaining information (e.g., thresholds, parameters, mapping information, and so on). In addition, the apparatuses 2602, 2604, and 2606 include user interface devices 2644, 2646, and 2648, respectively, for providing indications (e.g., audible and/or visual indications) to a user and/or for receiving user input (e.g., upon user actuation of a sensing device such a keypad, a touch screen, a microphone, and so on).

For convenience, the apparatus 2602 is shown in FIG. 26 as including components that may be used in the various examples described herein. In practice, the illustrated blocks may have different functionality in different aspects. For example, functionality of the block 2634 for providing the functionality of FIG. 4 may be different as compared to functionality of the block 2634 for providing the functionality of FIG. 9.

The components of FIG. 26 may be implemented in various ways. In some implementations, the components of FIG. 26 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 2608, 2632, 2638, and 2644 may be implemented by processor and memory component(s) of the apparatus 2602 (e.g., by execution of appropriate code and/or by appropriate configuration of processor components). Similarly, some or all of the functionality represented by blocks 2614, 2620, 2634, 2640, and 2646 may be implemented by processor and memory component(s) of the apparatus 2604 (e.g., by execution of appropriate code and/or by appropriate configuration of processor components). Also, some or all of the functionality represented by blocks 2626, 2636, 2642, and 2648 may be implemented by processor and memory component(s) of the apparatus 2606 (e.g., by execution of appropriate code and/or by appropriate configuration of processor components).

The components described herein may be implemented in a variety of ways. Referring to FIGS. 27, 28, 29, 30, 31, 32, and 33, apparatuses 2700, 2800, 2900, 3000, 3100, 3200, and 3300 are represented as a series of interrelated functional blocks that represent functions implemented by, for example, one or more integrated circuits (e.g., an ASIC) or implemented in some other manner as taught herein. As discussed herein, an integrated circuit may include a processor, software, other components, or some combination thereof.

The apparatus 2700 includes one or more modules that may perform one or more of the functions described above with regard to various figures. For example, an ASIC for authenticating 2702 may correspond to, for example, processing system as discussed herein. An ASIC for sending to a server 2704 may correspond to, for example, a communication device as discussed herein. An ASIC for receiving 2706 may correspond to, for example, a communication device as discussed herein. An ASIC for sending to a second apparatus 2708 may correspond to, for example, a transmitter as discussed herein.

The apparatus 2800 includes one or more modules that may perform one or more of the functions described above with regard to various figures. For example, an ASIC for receiving 2802 may correspond to, for example, communication device as discussed herein. An ASIC for authorizing 2804 may correspond to, for example, a processing system as discussed herein. An ASIC for sending 2806 may correspond to, for example, a communication device as discussed herein. An ASIC for establishing a session 2808 may correspond to, for example, a processing system as discussed herein. An ASIC for obtaining a cryptographic key 2810 may correspond to, for example, a processing system as discussed herein.

The apparatus 2900 includes one or more modules that may perform one or more of the functions described above with regard to various figures. For example, an ASIC for receiving 2902 may correspond to, for example, communication device as discussed herein. An ASIC for setting up a session 2904 may correspond to, for example, a processing system as discussed herein. An ASIC for communicating 2906 may correspond to, for example, a communication device as discussed herein. An ASIC for using a cryptographic key 2908 may correspond to, for example, a processing system as discussed herein. An ASIC for broadcasting 2910 may correspond to, for example, a transmitter as discussed herein.

The apparatus 3000 includes one or more modules that may perform one or more of the functions described above with regard to various figures. For example, an ASIC for commencing communication 3002 may correspond to, for example, processing system as discussed herein. An ASIC for communicating 3004 may correspond to, for example, a communication device as discussed herein. An ASIC for obtaining a cryptographic key 3006 may correspond to, for example, a processing system as discussed herein. An ASIC for using a cryptographic key 3008 may correspond to, for example, a processing system as discussed herein.

The apparatus 3100 includes one or more modules that may perform one or more of the functions described above with regard to various figures. For example, an ASIC for commencing transfer 3102 may correspond to, for example, processing system as discussed herein. An ASIC for transferring 3104 may correspond to, for example, a communication device as discussed herein. An ASIC for broadcasting 3106 may correspond to, for example, a communication device as discussed herein.

The apparatus 3200 includes one or more modules that may perform one or more of the functions described above with regard to various figures. For example, an ASIC for receiving from a server 3203 may correspond to, for example, communication device as discussed herein. An ASIC for sending 3204 may correspond to, for example, a transmitter as discussed herein. An ASIC for communicating via tunneled messages 3206 may correspond to, for example, a communication device as discussed herein.

The apparatus 3300 includes one or more modules that may perform one or more of the functions described above with regard to various figures. For example, an ASIC for receiving 3302 may correspond to, for example, communication device as discussed herein. An ASIC for using a cryptographic key 3304 may correspond to, for example, a processing system as discussed herein. An ASIC for obtaining a cryptographic key 3306 may correspond to, for example, a processing system as discussed herein. An ASIC for tunneling 3308 may correspond to, for example, a communication device as discussed herein. An ASIC for broadcasting 3310 may correspond to, for example, a communication device as discussed herein.

As noted above, in some aspects these modules may be implemented via appropriate processor components. These processor components may in some aspects be implemented, at least in part, using structure as taught herein. In some aspects, a processor may be configured to implement a portion or all of the functionality of one or more of these modules. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. In some aspects one or more of any components represented by dashed boxes are optional.

As noted above, the apparatuses 2700-3300 comprise one or more integrated circuits in some implementations. For example, in some aspects a single integrated circuit implements the functionality of one or more of the illustrated components, while in other aspects more than one integrated circuit implements the functionality of one or more of the illustrated components. As one specific example, the apparatus 2700 may comprise a single device (e.g., with components 2702-2708 comprising different sections of an ASIC). As another specific example, the apparatus 2700 may comprise several devices (e.g., with the component 2702 comprising one ASIC, the components 2704 and 2706 comprising another ASIC, and the component 2708 comprising another ASIC).

In addition, the components and functions represented by FIGS. 27-33 as well as other components and functions described herein, may be implemented using any suitable means. Such means are implemented, at least in part, using corresponding structure as taught herein. For example, the components described above in conjunction with the "ASIC for" components of FIGS. 27-33 correspond to similarly designated "means for" functionality. Thus, one or more of such means is implemented using one or more of processor components, integrated circuits, or other suitable structure as taught herein in some implementations. Several examples follow. In some aspects, means for receiving comprises a receiver. In some aspects, means for detecting comprises a processing system. In some aspects, means for generating comprises a processing system. In some aspects, means for transmitting comprises a transmitter. In some aspects, means for identifying comprises a processing system. In some aspects, means for determining comprises a processing system.

In some implementations, communication device structure such as a transceiver is configured to embody the functionality of a means for receiving. For example, this structure may be programmed or designed to invoke a receive operation. In addition, this structure may be programmed or designed to process (e.g., demodulate and decode) any signals received as a result of the receive operation. In addition, this structure may be programmed or designed to output data (e.g., a data unit, authentication information, an indication, or other information) extracted from the received signals as a result of the processing. Typically, the communication device structure comprises a wireless-based transceiver device or wire-based transceiver device.

In some implementations, communication device structure such as a transceiver is configured to embody the functionality of a means for sending. For example, this structure may be programmed or designed to obtain data (e.g., a data unit, authentication information, an indication, or other information) to be transmitted. In addition, this structure may be programmed or designed to process (e.g., modulate and encode) the obtained data. In addition, this structure may be programmed or designed to couple the processed data to one or more antennas for transmission. Typically, the communication device structure comprises a wireless-based transceiver device or wire-based transceiver device.

In some implementations, communication device structure such as a transceiver is configured to embody the functionality of a means for broadcasting. For example, this structure may be programmed or designed to obtain data (e.g., a data unit, authentication information, an indication, or other information) to be broadcasted. In addition, this structure may be programmed or designed to process (e.g., modulate and encode) the obtained data. In addition, this structure may be programmed or designed to couple the processed data to one or more antennas for transmission. Typically, the communication device structure comprises a wireless-based transceiver device or wire-based transceiver device.

In some implementations, communication device structure such as a transceiver is configured to embody the functionality of a means for communicating or means for transferring. For example, this structure may be programmed or designed to obtain data (e.g., a data unit, authentication information, an indication, or other information) to be communicated. In addition, this structure may be programmed or designed to process (e.g., modulate and encode) the obtained data. In addition, this structure may be programmed or designed to output the data. Complementation operations may be performed to receive data. Typically, the communication device structure comprises a wireless-based transceiver device or wire-based transceiver device.

In some implementations, processing system structure such as an ASIC or a programmable processor is configured to embody the functionality of a means for authenticating. This structure may be programmed or designed to receive a message. This structure may be programmed or designed to process the received message to authenticate an apparatus identified by the message. The structure may be programmed or designed to then output an indication indicative of the results of the processing.

In some implementations, processing system structure such as an ASIC or a programmable processor is configured to embody the functionality of a means for establishing. This structure may be programmed or designed to receive information (e.g., authentication information). This structure may be programmed or designed to process the received information to establish a session (e.g., identify another party to the session; identify session parameters). The structure may be programmed or designed to then output an indication indicative of the results of the processing (e.g., session parameters).

In some implementations, processing system structure such as an ASIC or a programmable processor is configured to embody the functionality of a means for setting up a session. This structure may be programmed or designed to receive information (e.g., authentication information). This structure may be programmed or designed to process the received information to set up a session (e.g., identify another party to the session; identify session parameters). The structure may be programmed or designed to then output an indication indicative of the results of the processing (e.g., session parameters).

In some implementations, processing system structure such as an ASIC or a programmable processor is configured to embody the functionality of a means for obtaining a cryptographic key. This structure may be programmed or designed to acquire cryptographic key input parameters. This structure may be programmed or designed to process the input parameters to generate a cryptographic key. The structure may be programmed or designed to then output the generated cryptographic key.

In some implementations, processing system structure such as an ASIC or a programmable processor is configured to embody the functionality of a means for using a cryptographic key. This structure may be programmed or designed to receive a cryptographic key. This structure may be programmed or designed to process the received cryptographic key to set up a communication channel (e.g., identify another party to a communication; authenticate information received from another party). The structure may be programmed or designed to then output an indication indicative of the results of the processing (e.g., send authentication information to another party).

In some implementations, processing system structure such as an ASIC or a programmable processor is configured to embody the functionality of a means for commencing communication or means for commencing transfer. This structure may be programmed or designed to receive an indication that communication should be established. This structure may be programmed or designed to trigger a communication component to initiate communication with another apparatus.

In some implementations, processing system structure such as an ASIC or a programmable processor is configured to embody the functionality of a means for tunneling. This structure may be programmed or designed to receive an indication that a tunnel should be established. This structure may be programmed or designed to trigger a communication component to initiate communication with another apparatus to establish the tunnel (e.g., exchanging source and destination addresses).

In some implementations, processing system structure such as an ASIC or a programmable processor is configured to embody the functionality of a means for authorizing. This structure may be programmed or designed to receive a message (e.g., identifying an entity to be authorized). This structure may be programmed or designed to process the received message to authorize an entity identified by the message as an authenticator (e.g., by authenticating a sender of the message). The structure may be programmed or designed to then output an indication indicative of the results of the processing (e.g., an indication that the entity has been authorized).

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code executable (e.g., executable by at least one computer) to provide functionality relating to one or more of the aspects of the disclosure. In some aspects, a computer program product may comprise packaging materials.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product. Although particular aspects are described herein, many variations and permutations of these aspects fall within the scope of the disclosure.

Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the description.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for communication, wherein the apparatus is configured to be associated with a second apparatus, the apparatus comprising:
a processing system configured to authenticate the apparatus to a server; and
a communication device configured to:
send a message to the server to authorize the second apparatus as an authenticator;
receive an authentication credential from the server as a result of sending the message, wherein the authentication credential is for setting up a session between the server and the second apparatus; and communicate with a third apparatus via encrypted messages tunneled and not decrypted by the second apparatus, wherein the third apparatus is associated with the second apparatus and not associated with the apparatus, and each encrypted message comprises an Extensible Authentication Protocol over Local Area Network (EAPOL) message.

2. The apparatus of claim 1, wherein:
the apparatus further comprises a transmitter configured to send the authentication credential to the second apparatus.

3. The apparatus of claim 2, wherein:
the server comprises a RADIUS server or a DIAMETER server;
the message comprises a RADIUS message or a DIAMETER message; and
the authentication credential comprises a RADIUS authentication credential or a DIAMETER authentication credential.

4. The apparatus of claim 1, wherein the message comprises a request to admit the second apparatus as a client of the server.

5. The apparatus of claim 1, wherein:
the communication device is further configured to receive a cryptographic master key from the server; and
the apparatus further comprises a transmitter configured to send the cryptographic master key to the second apparatus.

6. The apparatus of claim 5, wherein the cryptographic master key comprises a pairwise master key.

7. A method of communication, wherein a first apparatus is associated with a second apparatus, the method comprising:
authenticating the first apparatus to a server;
sending a message from the first apparatus to the server to authorize the second apparatus as an authenticator;
receiving an authentication credential from the server as a result of sending the message, wherein the authentication credential is for setting up a session between the server and the second apparatus; and
communicating with a third apparatus via encrypted messages tunneled and not decrypted by the second apparatus, wherein the third apparatus is associated with the second apparatus and not associated with the first apparatus, and each encrypted message comprises an Extensible Authentication Protocol over Local Area Network (EAPOL) message.

8. The method of claim 7, further comprising:
sending the authentication credential to the second apparatus.

9. The method of claim 8, wherein:
the server comprises a RADIUS server or a DIAMETER server;
the message comprises a RADIUS message or a DIAMETER message; and
the authentication credential comprises a RADIUS authentication credential or a DIAMETER authentication credential.

10. The method of claim 7, wherein the message comprises a request to admit the second apparatus as a client of the server.

11. The method of claim 7, further comprising:
receiving, by the first apparatus, a cryptographic master key from the server; and
sending the cryptographic master key from the first apparatus to the second apparatus.

12. The method of claim 11, wherein the cryptographic master key comprises a pairwise master key.

13. An apparatus for communication, wherein a second apparatus is configured to be authenticated to the apparatus, the apparatus comprising:
a communication device configured to:
receive a message from the second apparatus, wherein the message identifies a third apparatus associated with the second apparatus; and
send an authentication credential to the second apparatus, wherein the authentication credential is for setting up the session between the apparatus and the third apparatus; and
a processing system configured to authorize, as a result of receiving the message, the third apparatus as an authenticator, wherein:
the communication device is further configured to send a cryptographic key to the third apparatus to enable the third apparatus and a fourth apparatus to establish secure communication over a wireless channel, wherein the secure communication comprises encrypted messages tunneled and not decrypted by the third apparatus, wherein the fourth apparatus is associated with the third apparatus and not associated with the second apparatus, and each encrypted message comprises an Extensible Authentication Protocol over Local Area Network (EAPOL) message.

14. The apparatus of claim 13, wherein the message comprises a request to admit the third apparatus as a client of the apparatus.

15. The apparatus of claim 13, wherein:
the processing system is further configured to establish a session with a fourth apparatus associated with the third apparatus; and
the processing system is further configured to obtain the cryptographic key associated with the session.

16. A method of communication, wherein a first apparatus is authenticated to a server, the method comprising:
receiving, by the server, a message from the first apparatus, wherein the message identifies a second apparatus associated with the first apparatus;
authorizing, as a result of receiving the message, the second apparatus as an authenticator;
sending an authentication credential to the first apparatus, wherein the authentication credential is for setting up the session between the server and the second apparatus; and
send a cryptographic key to the second apparatus to enable the second apparatus and a third apparatus to establish secure communication over a wireless channel, wherein the secure communication comprises encrypted messages tunneled and not decrypted by the second apparatus, wherein the third apparatus is associated with the second apparatus and not associated with the first apparatus, and each encrypted message comprises an Extensible Authentication Protocol over Local Area Network (EAPOL) message.

17. The method of claim 16, wherein the message comprises a request to admit the second apparatus as a client of the server.

18. The method of claim 16, further comprising:
establishing a session with a third apparatus associated with the second apparatus; and
obtaining a cryptographic key associated with the session.

19. An access point for communication, wherein the access point is configured to be associated with a relay, the access point comprising:

at least one antenna;

a processing system configured to authenticate, via the at least one antenna, the access point to a server; and a communication device configured to:

send, via the at least one antenna, a message to the server to authorize the relay as an authenticator;

receive, via the at least one antenna, an authentication credential from the server as a result of sending the message, wherein the authentication credential is for setting up a session between the server and the relay; and communicate with a station via encrypted messages tunneled and not decrypted by the relay, wherein the station is associated with the relay and not associated with the access point, and each encrypted message comprises an Extensible Authentication Protocol over Local Area Network (EAPOL) message.

20. A server for communication, wherein an access point is configured to be authenticated to the server, the server comprising:

at least one antenna;

a communication device configured to:

receive, via the at least one antenna, a message from the access point, wherein the message identifies a relay associated with the access point;

send, via the at least one antenna, an authorization credential to the access point, wherein the authentication credential is for setting up a session between the server and the relay; and a processing system configured to authorize, as a result of receiving the message, the relay as an authenticator, wherein:

the communication device is further configured to send a cryptographic key to the relay to enable the relay and a station to establish secure communication over a wireless channel, wherein the secure communication comprises encrypted messages tunneled and not decrypted by the relay, wherein the station is associated with the relay and not associated with the access point, and each encrypted message comprises an Extensible Authentication Protocol over Local Area Network (EAPOL) message.

* * * * *